US011768673B2

(12) United States Patent
Dwivedi et al.

(10) Patent No.: US 11,768,673 B2
(45) Date of Patent: Sep. 26, 2023

(54) IDENTIFYING PROTOCOL RECOMMENDATIONS FOR APPLICATION DATA OBJECTS

(71) Applicant: Optum Technology, Inc., Eden Prairie, MN (US)

(72) Inventors: Sanjay K. Dwivedi, Noida (IN); Kunal Pankaj, Noida (IN); Kanishka Kartikeya, Noida (IN); Hitesh Kharbanda, Greater Noida (IN)

(73) Assignee: Optum Technology, Inc., Eden Prairie, MN (US)

( * ) Notice: Subject to any disclaimer, the term of this patent is extended or adjusted under 35 U.S.C. 154(b) by 18 days.

(21) Appl. No.: 17/355,852

(22) Filed: Jun. 23, 2021

(65) Prior Publication Data

US 2022/0413826 A1 Dec. 29, 2022

(51) Int. Cl.
*G06F 8/65* (2018.01)
*G06F 8/30* (2018.01)
(Continued)

(52) U.S. Cl.
CPC ............... *G06F 8/65* (2013.01); *G06N 5/02* (2013.01)

(58) Field of Classification Search
CPC ......... H04L 67/12; H04L 67/10; H04L 67/34; A61B 5/0022; A61B 5/02; A61B 5/082;
(Continued)

(56) References Cited

U.S. PATENT DOCUMENTS 9,715,495 B1 7/2017 Tacchi et al.
9,782,075 B2 10/2017 Redei
(Continued)

FOREIGN PATENT DOCUMENTS

| CN | 107111503 A | * | 8/2017 | ............... G06F 8/51 |
| CN | 109408034 A | * | 3/2019 | ............... G06F 8/20 |
| CN | 113450889 A | * | 9/2021 | |

OTHER PUBLICATIONS

Hillerman, Tiago et al. "Applying Clustering and AHP Methods for Evaluating Suspect Healthcare Claims," Journal of Computational Science, vol. 19, Mar. 1, 2017, pp. 97-111, DOI: 10.1016/J.JOCS.2017.02.007.
(Continued)

*Primary Examiner* — Daxin Wu
(74) *Attorney, Agent, or Firm* — ALSTON & BIRD LLP

(57) ABSTRACT

Embodiments of the present disclosure provide methods, apparatus, systems, computing devices, computing entities, and/or the like for generating a protocol recommendation for an application data object. In accordance with one embodiment, a method is provided comprising: extracting application codes from the application data object representing application codes; generating a graph representation data object that includes code nodes representing the application codes, and edges connecting code nodes to indicate an association between the code nodes; identifying a replaceable code node; extracting substitute code nodes from the graph representation data object; identifying a replacement configuration of the graph representation data object with the replaceable code node with one of the substitute code nodes; and generating the protocol recommendation based at least in part on the replacement configuration.

17 Claims, 12 Drawing Sheets

(51) Int. Cl.
*G06N 5/04* (2023.01)
*G06N 5/02* (2023.01)

(58) Field of Classification Search
CPC ............. A61B 5/145; A61B 5/14552; A61B 2560/045; A61M 5/142; A61M 5/14216; A61M 5/14228; A61M 2005/1405; A61M 2205/3561; A61M 2205/3569; A61M 2205/3584; A61M 2205/3592; A61M 2205/50; A61M 2205/502; A61M 2205/52; A61M 2205/6054; A61M 2205/6072; G06F 8/65; G06F 8/30; G16H 10/00; G16H 20/17; G16H 40/40; H04W 4/50; G06N 5/02; G06N 5/04
See application file for complete search history.

(56) References Cited

U.S. PATENT DOCUMENTS

| | | | |
|---|---|---|---|
| 9,792,658 | B1 | 10/2017 | Vijendra et al. |
| 10,216,902 | B2 | 2/2019 | Vesto et al. |
| 2011/0077958 | A1 | 3/2011 | Breitenstein et al. |
| 2012/0185275 | A1 | 7/2012 | Loghmani |
| 2016/0005129 | A1 | 1/2016 | Chavarria et al. |
| 2016/0225096 | A1 | 8/2016 | Wells et al. |
| 2016/0283362 | A1* | 9/2016 | Seto .................. G06F 16/2455 |
| 2016/0358354 | A1* | 12/2016 | Alli ..................... H04L 67/02 |
| 2017/0024194 | A1* | 1/2017 | Sevenich ............ G06F 8/443 |
| 2019/0013093 | A1 | 1/2019 | Slepian et al. |
| 2019/0243621 | A1* | 8/2019 | Gass .................... G06F 8/65 |
| 2019/0243629 | A1* | 8/2019 | Gass .................... G06F 8/40 |
| 2019/0243641 | A1* | 8/2019 | Gass .................... G06F 8/427 |
| 2022/0318197 | A1* | 10/2022 | Sarkis ................ G06F 16/93 |

OTHER PUBLICATIONS

Kumar, Srijan et al. "Edge Weight Prediction in Weighted Signed Networks," 2016 IEEE 16th International Conference on Data Mining, Dec. 2016, pp. 221-230, DOI: 10.1109/ICDM.2016.175.

Li, Yongli et al. "A New Network Node Similarity Measure Method and Its Applications," arXiv preprint arXiv:1403.4303, Mar. 17, 2014, pp. 1-12.

Mishra, Abhinav et al. "Finding the Bias and Prestige of Nodes in Networks Based on Trust Scores," In Proceedings of the 20th International Conference on World Wide Web, Mar. 28, 2011, pp. 567-576, Hyderabad, India.

Uddin, Shahadat. "Administrative Claim Data to Learn About Effective Healthcare Collaboration and Coordination Through Social Network," 2015 48th Hawaii International Conference on System Sciences, Jan. 5, 2015, (10 pages), IEEE, Kauai, HI, USA, DOI: 10.1109/HICSS.2015.375, ISBN: 978-1-4799-7367-5, ISSN: 1530-1605.

* cited by examiner

| | e1 | e2 | e3 | e4 | e5 | e6 | e7 |
|---|---|---|---|---|---|---|---|
| CPT1 | 1 | 1 | 0 | 0 | 0 | 0 | 0 |
| CPT2 | 0 | 1 | 1 | 0 | 0 | 0 | 0 |
| CPT3 | 1 | 0 | 1 | 1 | 0 | 0 | 0 |
| CPT4 | 0 | 0 | 0 | 1 | 1 | 0 | 0 |
| CPT5 | 0 | 0 | 0 | 0 | 0 | 1 | 1 |
| CPT6 | 0 | 0 | 0 | 1 | 0 | 1 | 1 |

$I_{CPT}$ = CPT Incidence Matrix

FIG. 5A

| | CPT1 | CPT2 | CPT3 | CPT4 | CPT5 | CPT6 |
|---|---|---|---|---|---|---|
| CPT1 | 0 | 1 | 1 | 0 | 0 | 0 |
| CPT2 | 1 | 0 | 1 | 0 | 0 | 0 |
| CPT3 | 1 | 1 | 0 | 1 | 0 | 1 |
| CPT4 | 0 | 0 | 1 | 0 | 0 | 1 |
| CPT5 | 0 | 0 | 0 | 0 | 0 | 1 |
| CPT6 | 0 | 0 | 1 | 1 | 1 | 0 |

$A_{CPT}$ = CPT Adjacency Matrix

FIG. 5B

Edge Weights

Synthesized Edge Weights

IDENTIFYING PROTOCOL RECOMMENDATIONS FOR APPLICATION DATA OBJECTS

TECHNOLOGICAL FIELD

Embodiments of the present disclosure generally relate to systems and methods for identifying protocol recommendations for application data objects. Specifically, embodiments of the present disclosure relate to systems and methods for identifying such protocol recommendations through the use of graph representations analytics configured to represent various application codes found in the application data objects to identify a preferred configuration of the application codes for the application data objects.

BACKGROUND

A need exists in the industry to address technical challenges related to identifying protocol recommendations for application data objects used in various applications. Here, the application data objects may include a number of different application codes that are used in the applications, and these different application codes may be provided via a number of different configurations in the application data objects. Accordingly, a protocol recommendation for an application data object may involve providing a recommendation of a configuration for the application data object with one or more preferred application codes, as well as in some instances a preferred structure for the one or more application codes. It is with respect to these considerations and others that the disclosure herein is presented.

BRIEF SUMMARY

In general, embodiments of the present disclosure provide methods, apparatus, systems, computing devices, computing entities, and/or the like for identifying a protocol recommendation for an application data object used in performing an application. In accordance with one aspect of the present disclosure, a method is provided. In various embodiments, the method comprises: determining a plurality of application codes for the application data object; determining a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes; identifying a replaceable code node of the plurality of code nodes; and responsive to identifying the replaceable code node: determine one or more substitute code nodes of the plurality of code nodes from the graph representation data object, wherein each substitute code node of the plurality of substitute code nodes represents a substitute application code that can replace the application code of the plurality of application codes represented by the replaceable code node; determining a replacement configuration of the graph representation data object, wherein the replacement configuration is characterized by a target substitute code node of the one or more substitute code nodes; and generating the protocol recommendation for the application data object based at least in part on the replacement configuration.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: determine a plurality of application codes for the application data object; determine a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes; identify a replaceable code node of the plurality of code nodes; and responsive to identifying the replaceable code node: determine one or more substitute code nodes of the plurality of code nodes from the graph representation data object, wherein each substitute code node of the plurality of substitute code nodes represents a substitute application code that can replace the application code of the plurality of application codes represented by the replaceable code node; determine a replacement configuration of the graph representation data object, wherein the replacement configuration is characterized by a target substitute code node of the one or more substitute code nodes; and generate the protocol recommendation for the application data object based at least in part on the replacement configuration.

In accordance with yet another aspect of the present disclosure, a computer program product is provided. In particular embodiments, the computer program product includes a non-transitory computer storage medium having instructions stored therein. The instructions being configured to cause one or more processors to at least perform operations configured to: determine a plurality of application codes for the application data object; determine a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes; identify a replaceable code node of the plurality of code nodes; and responsive to identifying the replaceable code node: determine one or more substitute code nodes of the plurality of code nodes from the graph representation data object, wherein each substitute code node of the plurality of substitute code nodes represents a substitute application code that can replace the application code of the plurality of application codes represented by the replaceable code node; determine a replacement configuration of the graph representation data object, wherein the replacement configuration is characterized by a target substitute code node of the one or more substitute code nodes; and generate the protocol recommendation for the application data object based at least in part on the replacement configuration.

BRIEF DESCRIPTION OF THE SEVERAL VIEWS OF THE DRAWINGS

Figure 1:
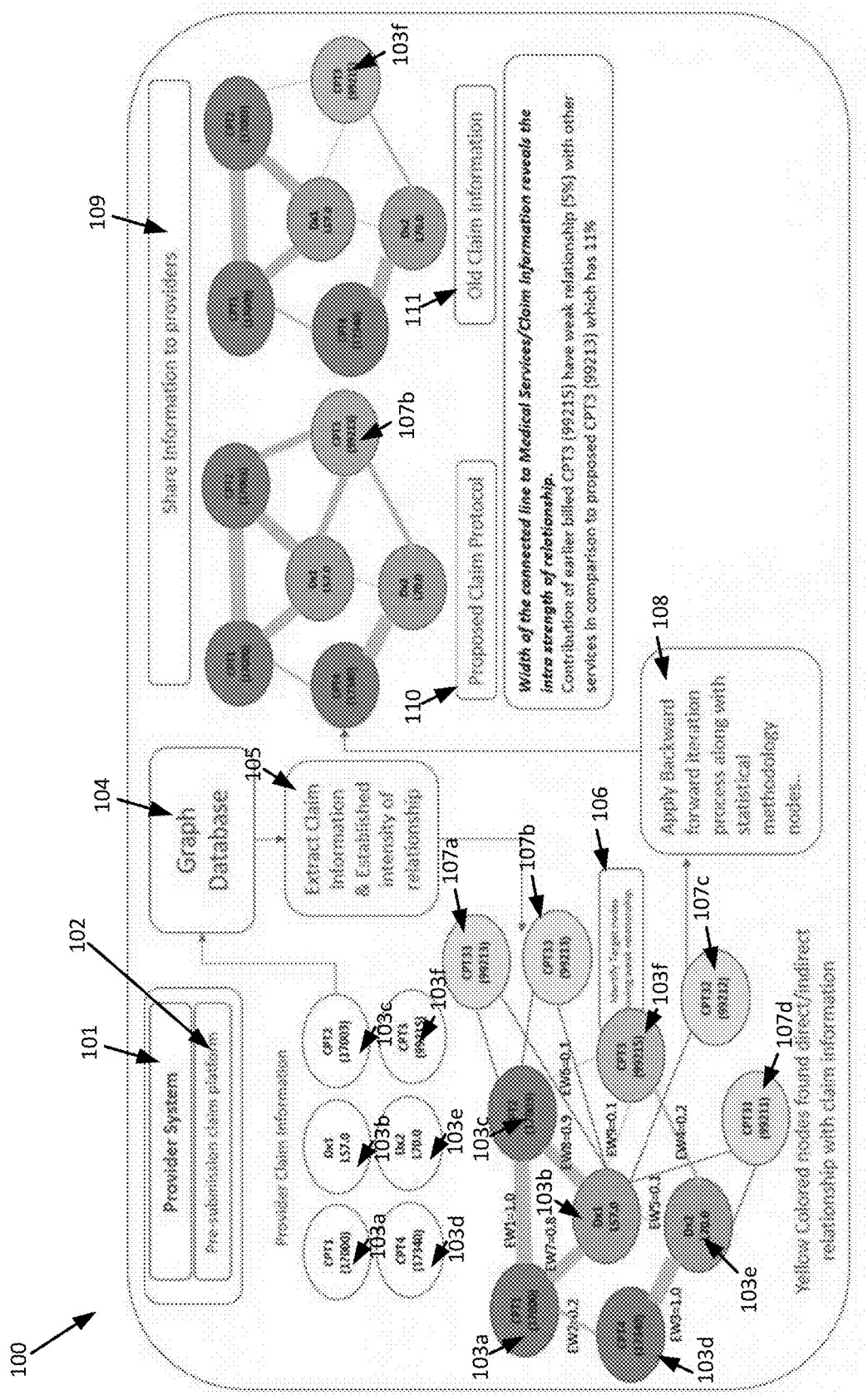
Figure 2:
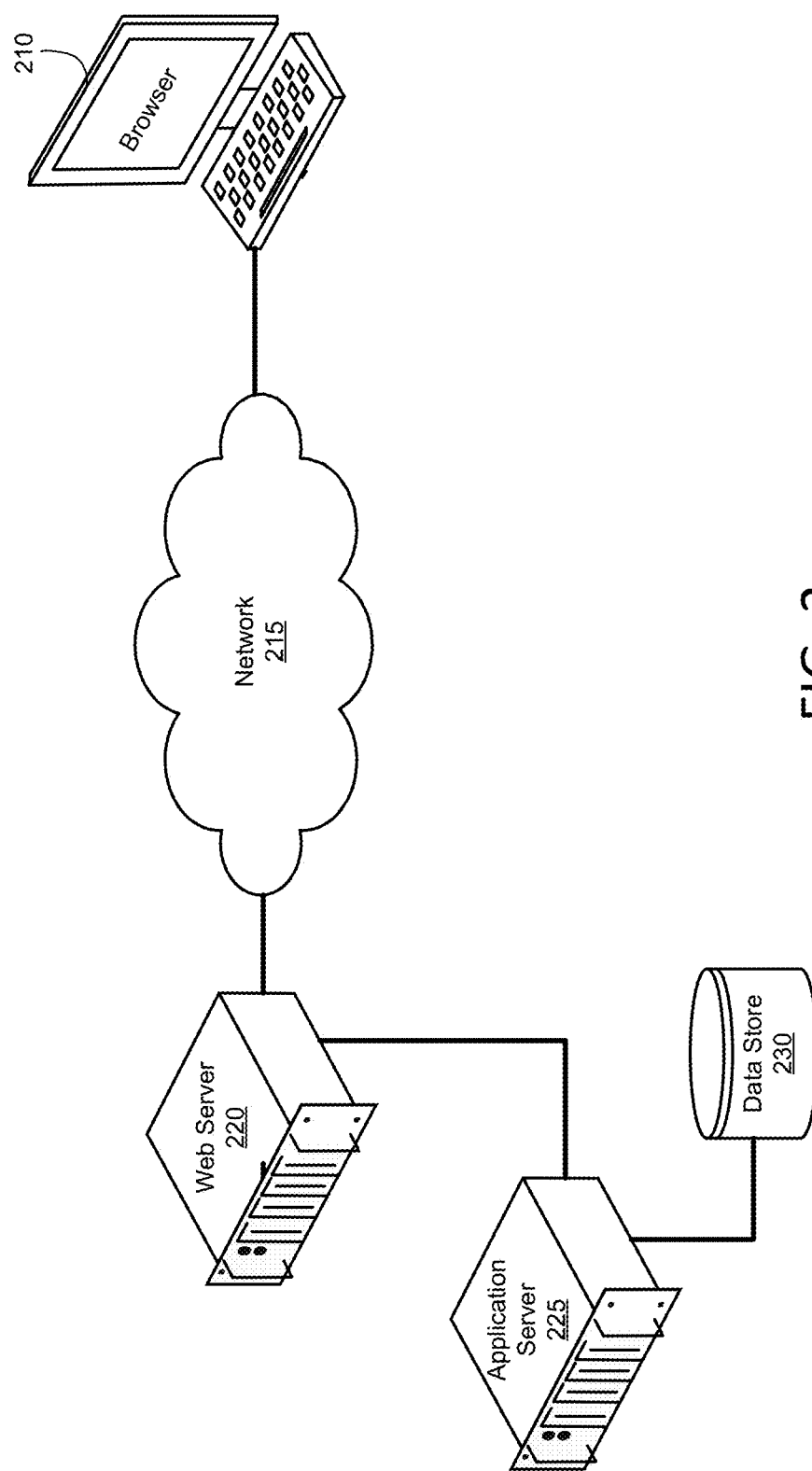
Figure 3:
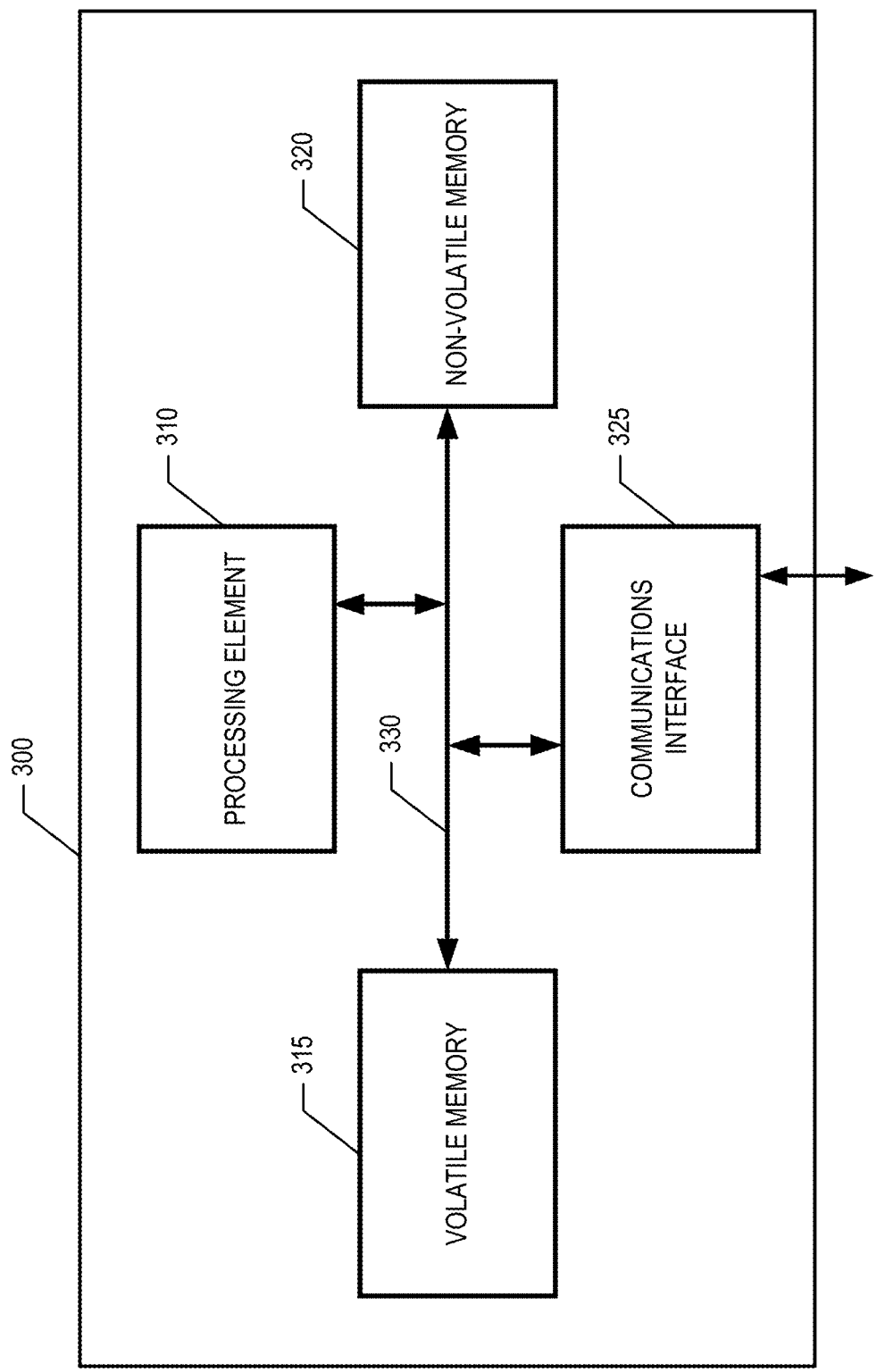
Figure 4:
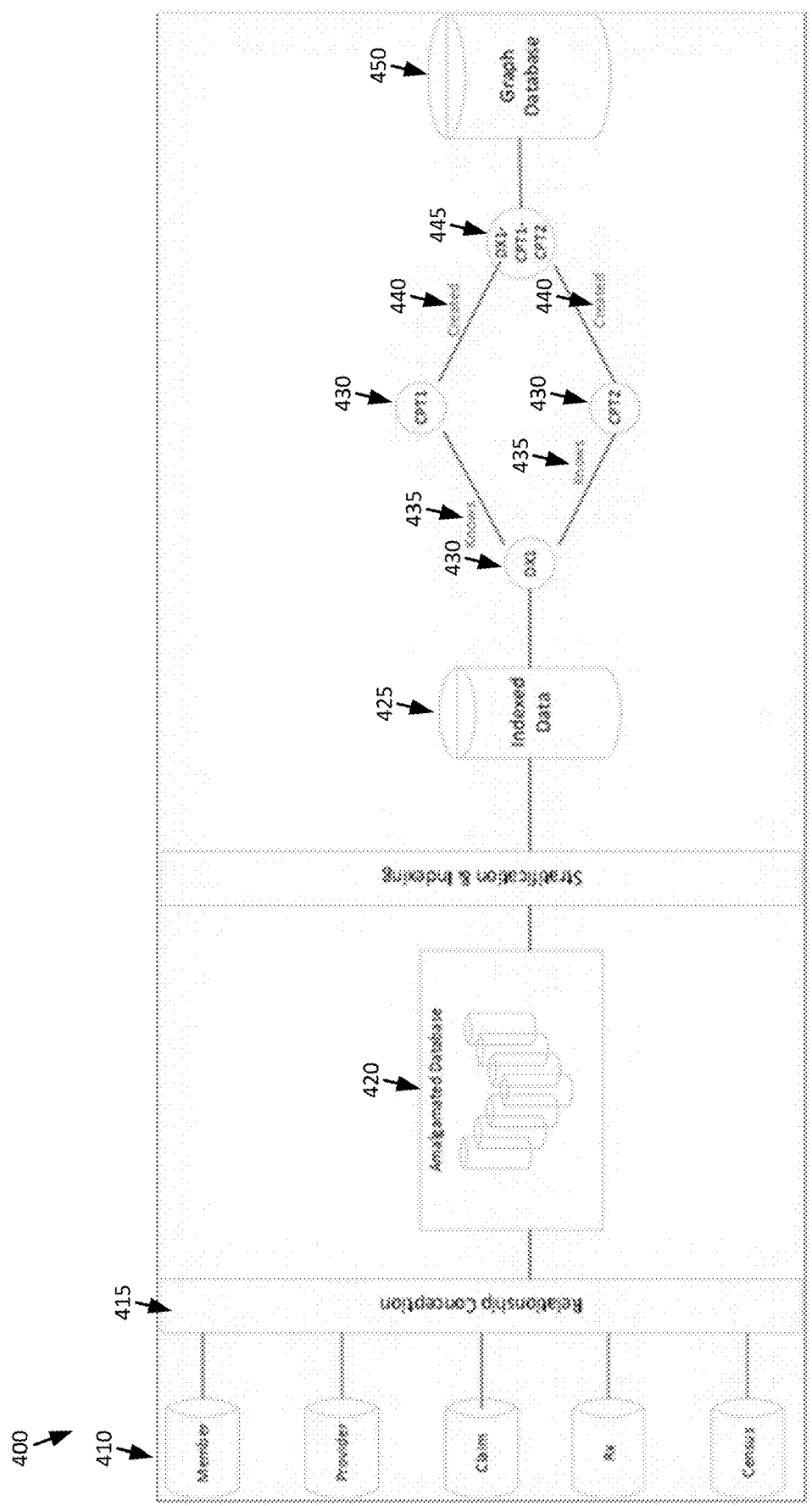
Figure 6A:
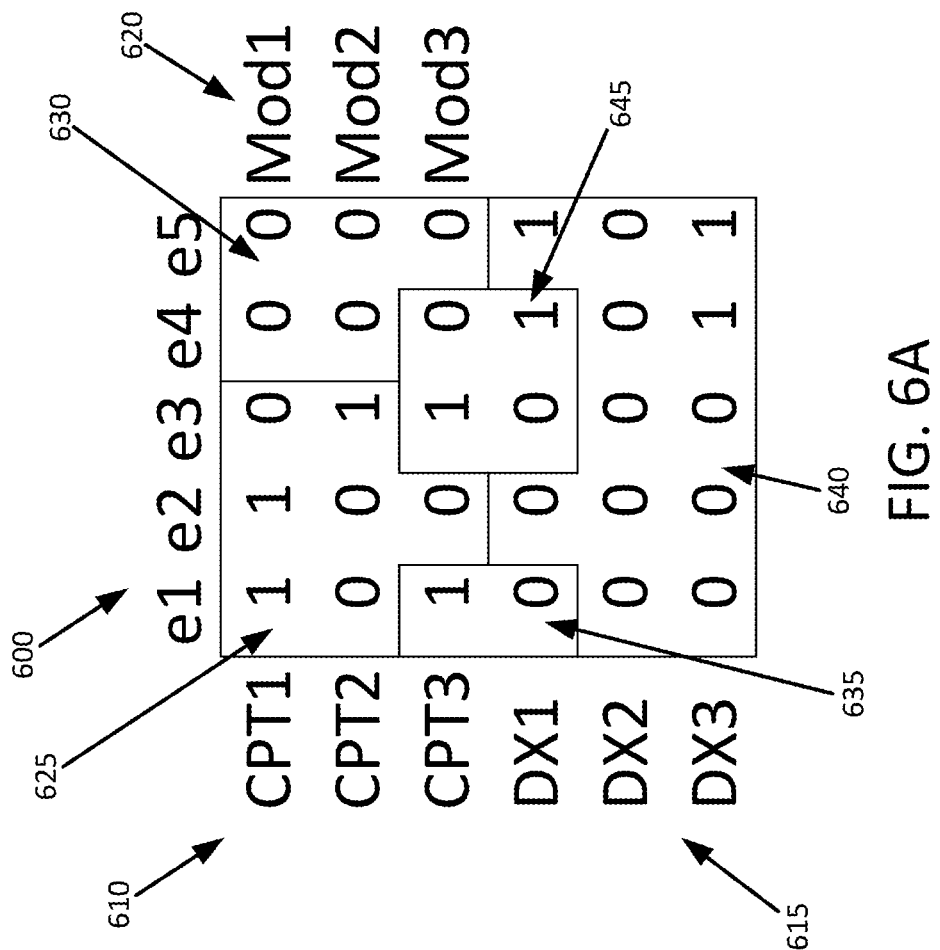
Figure 6B:
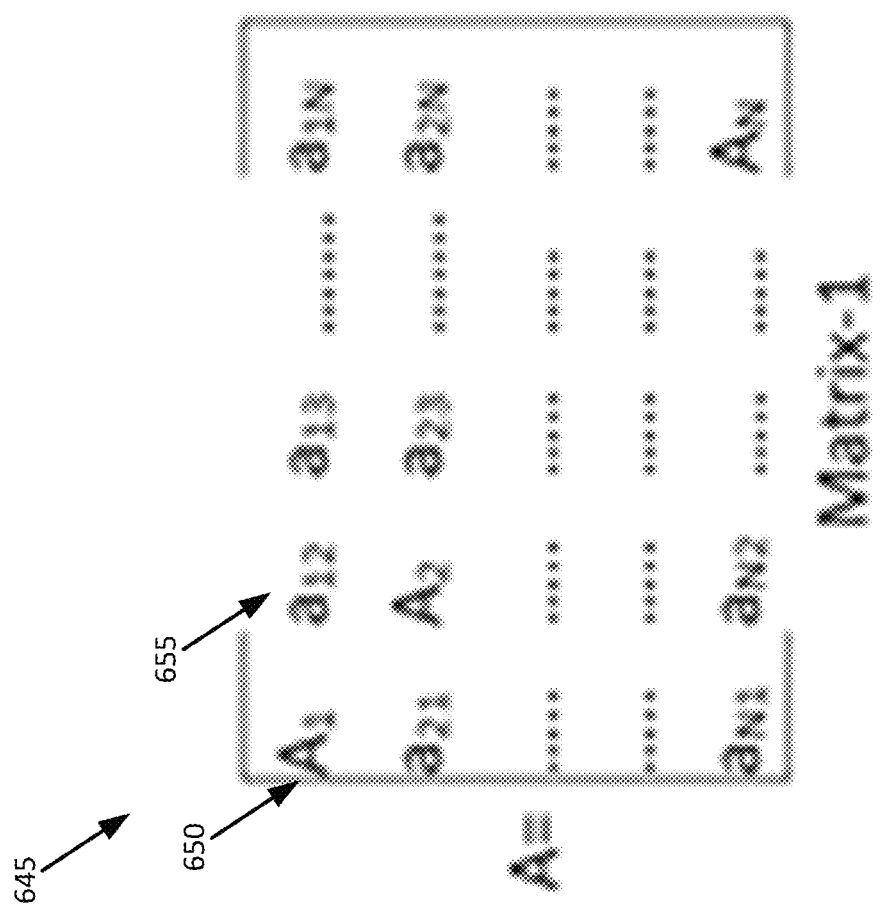
Figure 7:
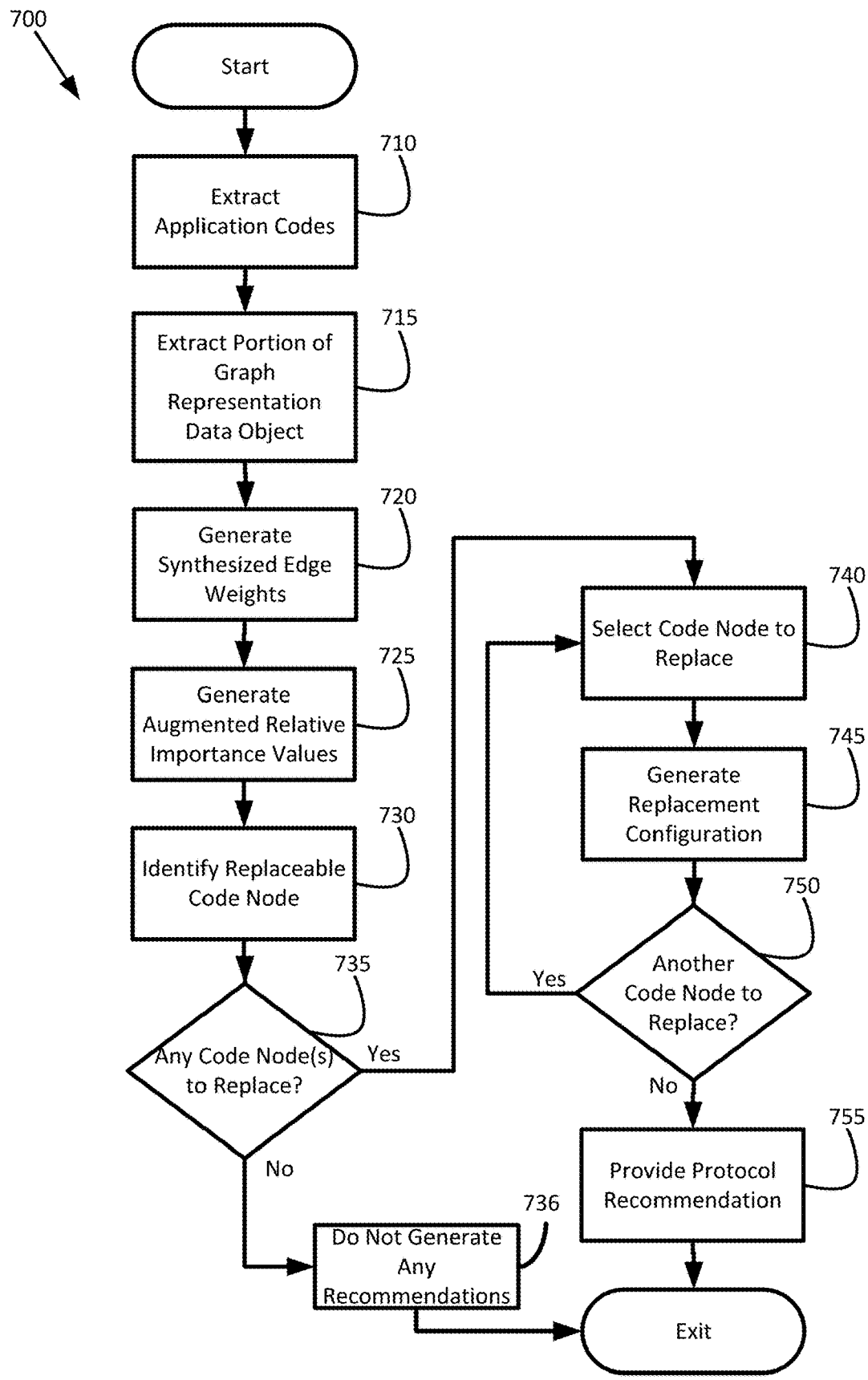
Figure 8A:
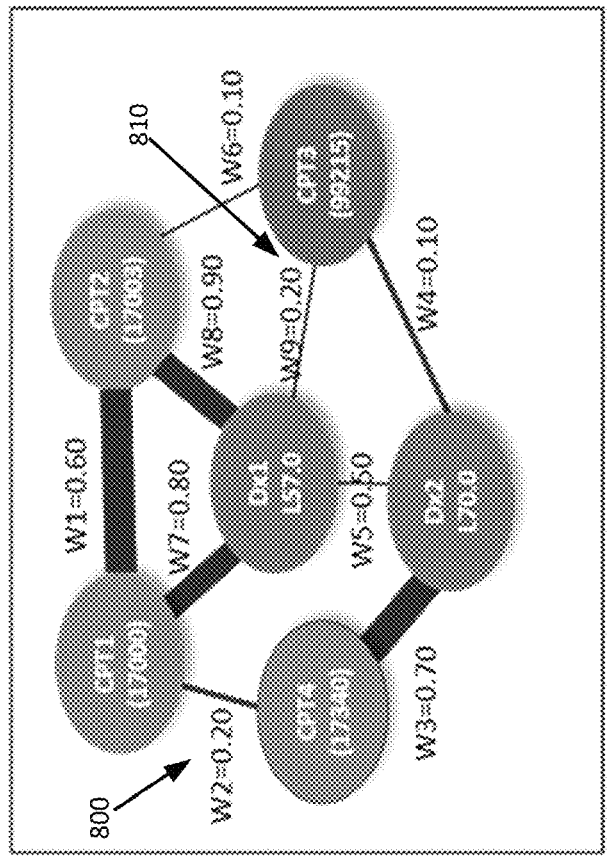
Figure 8B:
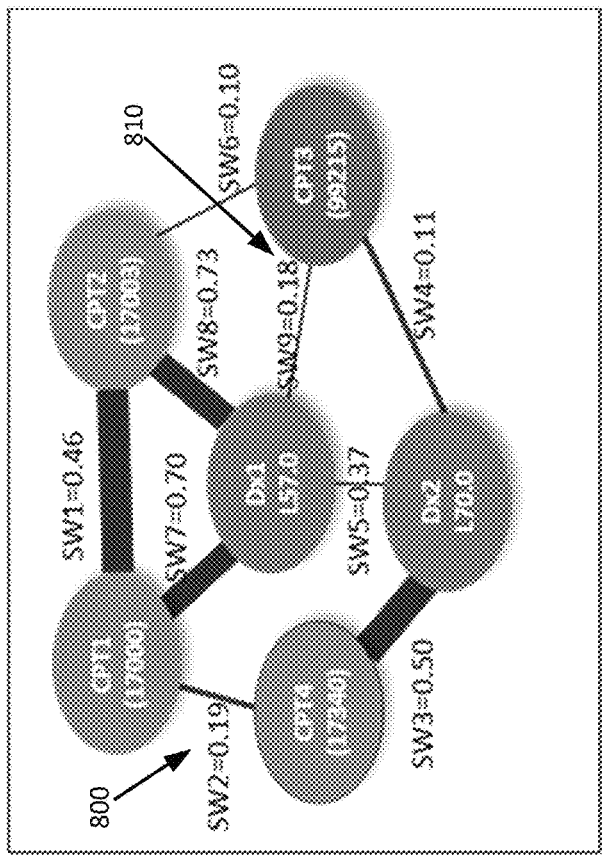
Figure 9B:
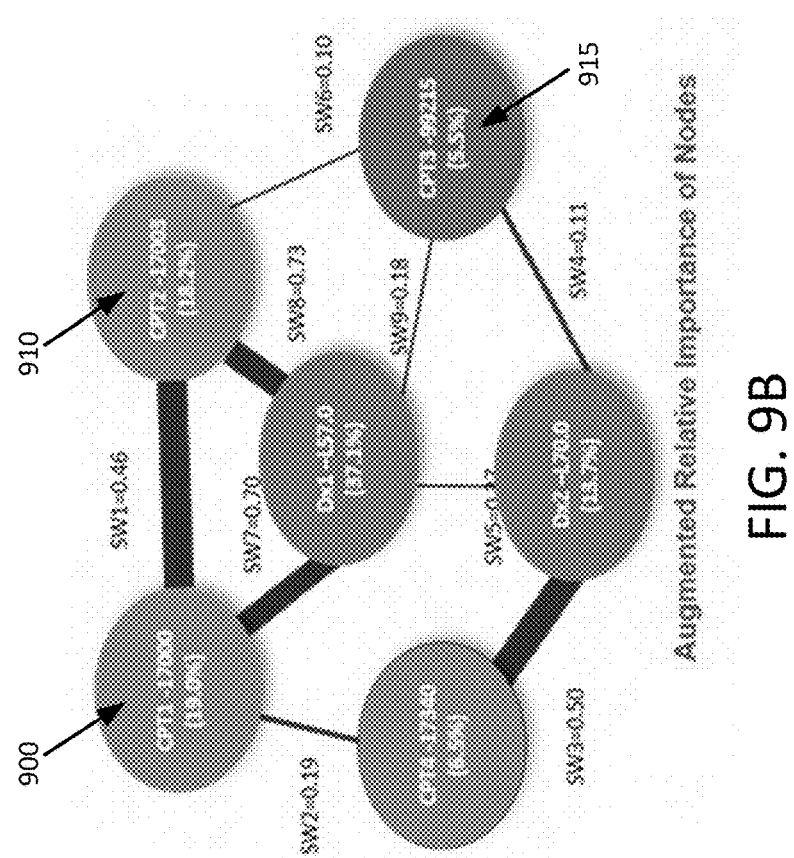
Figure 9A:
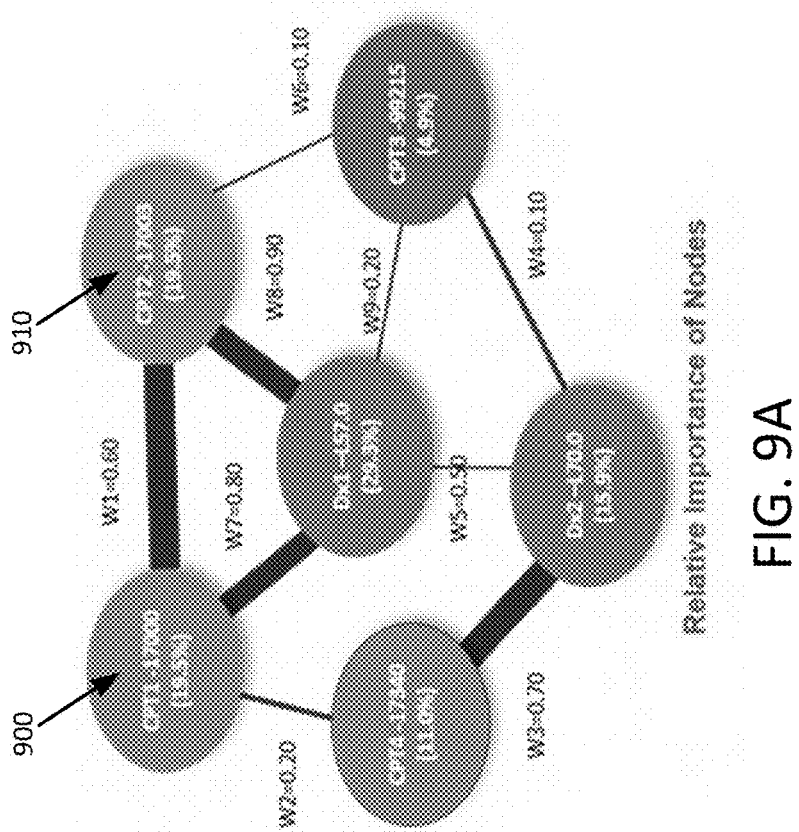
Figure 10:
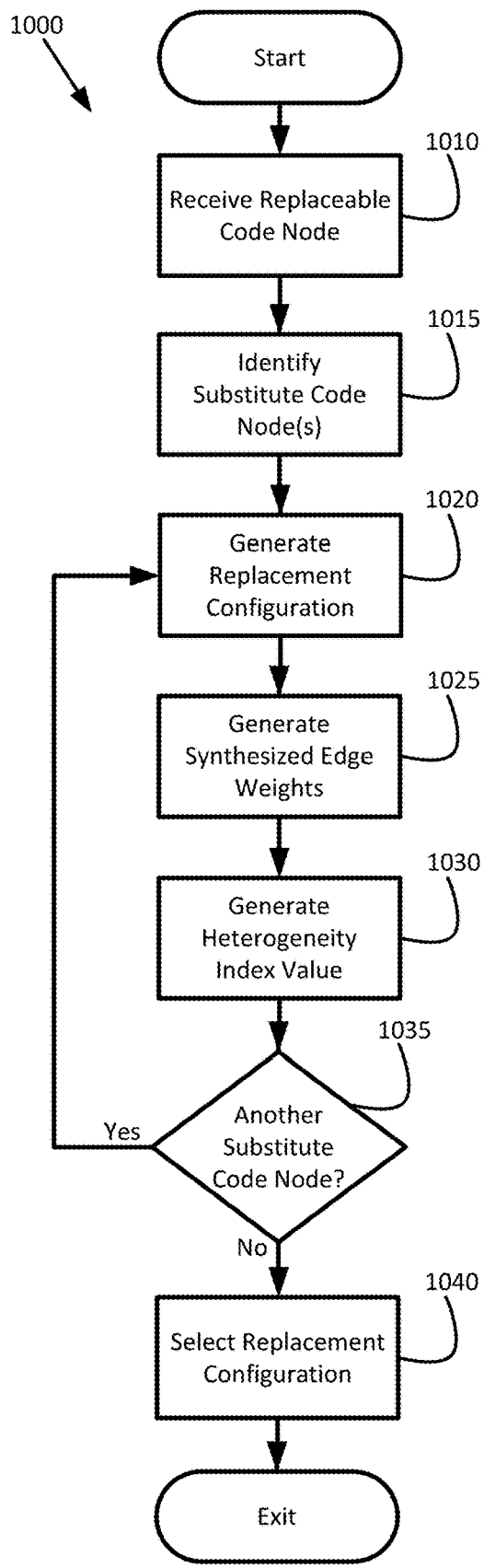
Figure 11:
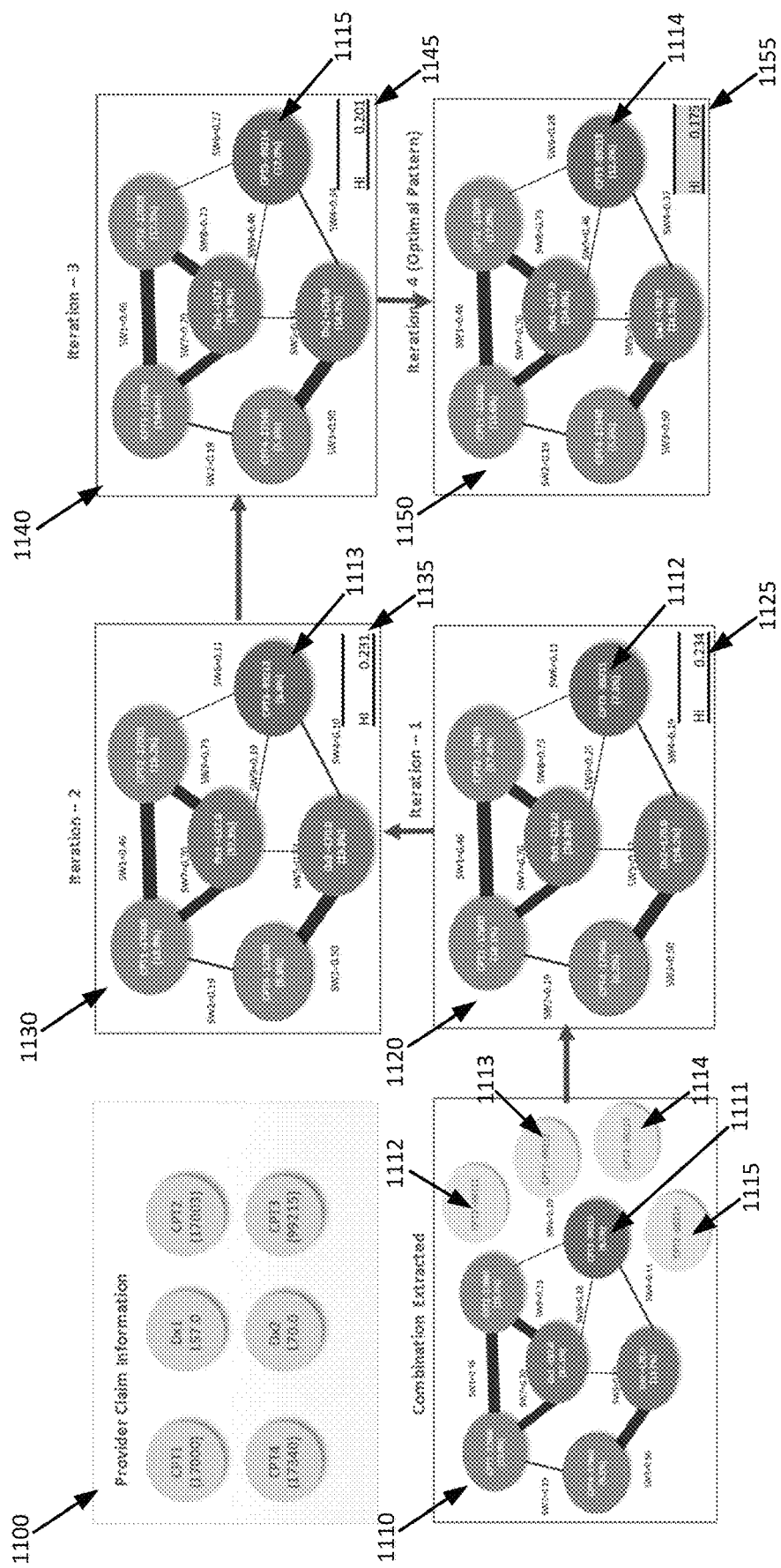

Having thus described the disclosure in general terms, reference will now be made to the accompanying drawings, which are not necessarily drawn to scale, and wherein:

FIG. 1 is an overall of the protocol recommendation framework according to various embodiments of the present disclosure;

FIG. 2 is a diagram of a system architecture that can be used in conjunction with various embodiments of the present disclosure;

FIG. 3 is a schematic of a computing entity that may be used in conjunction with various embodiments of the present disclosure;

FIG. 4 is a diagram of a process for generating a graph representation data object in accordance with various embodiments of the present disclosure;

FIGS. 5A and 5B are examples of incidence matrix representations and adjacency matrix representations that may be used in accordance with various embodiments of the present disclosure;

FIGS. 6A and 6B are further examples of N-dimensional matrix representations that may be used in accordance with various embodiments of the present disclosure;

FIG. 7 is a process flow for generating a protocol recommendation in accordance with various embodiments of the present disclosure;

FIGS. 8A and 8B provide operational examples of generating edge weights and synthesized edge weights in accordance with various embodiments of the present disclosure;

FIGS. 9A and 9B provide operational examples of generating relative importance values of nodes and augmented relative importance values of nodes in accordance with various embodiments of the present disclosure;

FIG. 10 is a process flow for identifying a replacement configuration in accordance with various embodiments of the present disclosure; and FIG. 11 is an operational example of a heterogeneity determination iteration performed to identify a replacement configuration in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "application data object" may refer to a data object representing features (e.g., requirements, operations, and/or the like) of at least one computer-implemented process. Specifically, in various embodiments, an application data object may comprise data that is expected to be in a preferable configuration so that the data can be processed for an intended purpose. In many instances, the data found in the application data object may be provided as one or more application codes. For example, an application data object may be a health insurance claim submitted by healthcare provider to a health insurance provider on behalf of an insured party to request payment for one or more medical procedures, services, treatments, and/or the like rendered to the insured party by the healthcare provider. Accordingly, the health insurance claim may provide data in the form of application codes such as one or more diagnoses codes for medical conditions being experienced by the insured party, as well as procedure codes and/or modifier codes for one or more procedures, services, treatments, and/or the like provided to address the medical conditions. Here, the health insurance provider may process the health insurance claim (e.g., may process the application codes found in the health insurance claim) to determine the amount of payment to be made on the claim. Therefore, the application codes in the form of the codes and/or modifier codes for medical diagnoses and/or medical procedures, services, treatments, and/or the like rendered can serve as important codes in determining the amount of payment to be made on the claim. In another example, the application data object may be a contract entered into by a buyer and a seller for the purchase of real estate. In this example, a banking institution who has been approached by the buyer to finance the purchase (e.g., provide a mortgage) may process the various sections (as application codes) found within the contract in determining whether to provide the financing for the purchase of the real estate. Therefore, in this example, the application codes in the form of different sections of the contract may serve as important codes in determining whether the banking institution provides the financing for the purchase of the real estate. In yet another example, the application data object may be a set of instructions (e.g., computer program code) processed by some type of automation (e.g., machinery) in performing a manufacturing task. Here, the application codes may be viewed as different portions of code such as, for example, modules, routines, data objects, and/or the like. Accordingly, the application codes in the form of the different portions of code may be important codes in whether the automation is able to perform the manufacturing task correctly. Those of ordinary skill in the art can envision several different application data objects that may be applicable to various embodiments of the disclosure in light of the description provided herein.

The term "application" may refer to a data object representing features of a computer-implemented process, task, action, operation, request, and/or the like involving the use of an application data object. For example, an application may involve the processing by a health insurance provider of health insurance claims that have been submitted by healthcare providers to determine the portion of the medical fees found in the claims that are the responsibility of the insured party and the amount of payment to be made by the health insurance provider to cover the medical fees. Accordingly, the application data object used for the application may be the health insurance claims submitted by the healthcare providers, themselves, and the accuracy of the data (e.g., application codes) found in the claims may be important in determining the fee amounts that are the responsibility of the insured party and the health insurance provider. Therefore, as previously noted, one or more application codes provided in the data found in an application data object may be important codes in performance of the application. Depending on the circumstances, the application may be automated, manual, or a combination of both. For example, the health insurance provider may make use of a software application configured for processing the application codes (e.g., diagnoses and/or medical procedures, services, treatments and/or the like) found in the health insurance claims to identify the fee amounts that are the responsibility of the insured party and the health insurance provider. In some instances, the software application may be configured to identify when the application codes found in a health insurance claim are inconsistent, and as a result deny the claim. Another application may involve the operation of machinery within a manufacturing environment such as, for example, an automotive production plant. Here, the application may involve the operation of automated machinery used in manufacturing a product such as an automobile. Therefore, the application may involve the processing of an application data object in the form of instructions (e.g., a computer program) used in controlling the automated machinery, and the accuracy of the data (e.g., application codes) provided by the application data object may be vital in ensuring the machinery performs in a correct manner during the manufacturing process. Those of ordinary skill in the art will recognize other types of applications in which embodiments of the disclosure may be used in light of the description provided herein.

The term "protocol recommendation" may refer to a data object representing features of recommendation provided for a preferred configuration for an application data object. As previously noted, in various embodiments, an application is configured to process data provided by the application data object to perform its intended purpose. For example, an application may involve the processing by a health insurance provider of submitted insurance claims requesting payment of fees for medical procedures, services, treatments, and/or the like provided by healthcare providers to insured parties to determine the portions of the medical fees that are the responsibility of the insured parties and the portions that are the responsibility of the health insurance provider. Accordingly, the health insurance provider may process the data (e.g., application codes) found in the claims in performing its assessment in determining the amount of payment that should be made out on the insurance claims. In many instances, the health insurance provider has rules, guidelines, regulations, standards, and/or the like that are used in combination with the data found in the insurance claims in making its assessment. Therefore, the configuration of the data (e.g., application codes) can be very important in performing a successful assessment. This may be even more important where the health insurance provider is using automation in performing the assessment. Thus, various embodiments of the disclosure are configured to evaluating the data found in an application data object, such as an insurance claim, and identifying a protocol recommendation for the data provided by the application data object.

The term graph representation data object may refer to a data object that represents a graph structure used for representing data that may be found in an application data object. For instance, in particular embodiments, the graph representation data object may represent a graph database. Accordingly, the graph representation data object includes a plurality of code nodes used to represent application codes found in the data of an application data object. These code nodes may include one or more attribute properties identifying attributes of the nodes. For example, an attribute property may be a quantity, quality, feature, characteristic, and/or the like demonstrated by the application code represented by a code node. In addition, in particular embodiments, the graph representation data object includes a plurality of edges connecting code nodes. Each edge of the plurality of edges connects two code nodes to indicate an association between the two code nodes. In addition, each edge may include an edge weight representing an intensity of the association between the two code nodes. In some embodiments, one or more values for an attribute property of one or more code nodes may be used in generating the edge weight for an edge. As discussed further herein, the graph representation data object may be used in various embodiments for identifying a protocol recommendation for an application data object to be used for an application. For instance, various embodiments of the disclosure involve extracting a portion of the graph representation data object to represent the application codes found in the data for the application data object and identifying one or more application codes for replacement based at least in part on the relative importance of the code nodes representing the one or more application codes in the portion of the graph representation data object. Accordingly, in particular embodiments, one or more substitute code nodes may be identified from the graph representation data object and an evaluation may be carried out that involves replacing the one or more code nodes representing the application codes with the one or more substitute code nodes to identify a protocol recommendation for the application data object.

The term "synthesized edge weight" may refer to a data object representing a value generated in various embodiments from an edge weight of an edge found in a portion of a graph representation data object used to represent a plurality of application codes found in an application data object. Here, in particular embodiments, the synthesized edge weight is designed to incorporate inferences about variation in the portion of the graph representation data object by smoothing the edge weight based at least in part on obtaining a preferred pattern of application codes. Accordingly, in some embodiments, the synthesized edge weight is generated using structural properties of common code node neighbors based at least in part on variability present in the portion of the graph representation data object. Specifically, in some embodiments, the synthesized edge weight is generated for an edge by using structural properties of common code node neighbors, as different common code node neighbors may have different contributions on the connection likelihood. Thus, in various embodiments, the synthesized edge weight for an edge supports to quantify the edge importance in relation to other edges found in the portion of the graph representation data object.

The term "augmented relative importance value" may refer to a data object representing a value generated to represent: (i) the contribution of a code node with respect to strength of relationships with other code nodes found in a portion of a graph representation data object, as well as (ii) the number of edges connected to the code node. Accordingly, in various embodiments, the augmented relative importance value defines not only the strength of the code node, but also emphasizes the degree of the code node by taking into consideration the number of edges connected to the code node. As detailed further herein, in particular embodiments, the augmented relative importance value is used for identifying those code nodes found in the portion of the graph representation data object that should be replaced based at least in part on their strength for replacement by code nodes representing alternative application codes. Accordingly, in some embodiments, a code node to be replaced is identified based at least in part on the code node having an augmented relative importance value not satisfying a contribution threshold.

The term "heterogeneity index value" may refer to a data object representing a value generated to represent a measure of variability of a group of code nodes found in a portion of a graph representation data object. In particular embodiments, iterations are performed in which configurations of the portion of the graph representation data object are generated by replacing one or more code nodes identified as having an augmented relative importance value not satisfying a contribution threshold with one or more substitute code nodes. Accordingly, a heterogeneity index value is generated for each iteration to identify the configuration of the graph representation data object demonstrating the lowest variability. This configuration is then used in particular embodiments in generating the protocol recommendation for the application data object.

The term "application-based interface" may refer to an electronically displayable user interface used in presenting a protocol recommendation for a particular application data object to an individual. For example, the application-based interface may be an electronic display viewable on a computer screen used for displaying a protocol recommendation for an application data object. In particular embodiments, the application-based interface may be configured to receive input indicating an initial configuration of an application data object, and to display (once identified) a protocol recommendation for the application data object. For example, in some embodiments, the application-based interface may be configured as one or more webpages accessible by an individual (e.g., end-user) who is accessing the one or more webpages via a browser on a computing entity being used by the individual.

Overview

Embodiments of the disclosure disclose a novel framework for identifying a protocol recommendation for an application data object used in performing an application. For example, the application may be a manufacturing process using automated machinery and the application data object may be a computer program used in running the automated machinery. Here, the computer program may include a plurality of application codes configured as portions of the computer program such as, data objects, program modules, routines, sub-routines, procedures, and/or the like. Accordingly, various embodiments of the disclosure may provide a protocol recommendation for the computer program that identifies a recommended configuration of the computer program in the form of what portions of the computer program should be included, what portions of the computer program should be replaced with other portions of computer program, and/or the structure of the portions to include in the computer program. Thus, the protocol recommendation may enable the automated machinery using the computer program to perform the manufacturing process correctly, and to operate in a computationally efficient and reliable manner.

In another example, the application may entail the processing by a health insurance provider of health insurance claims submitted by healthcare providers based at least in part on medical procedures, services, treatments, and/or the like provided to parties (individuals) insured by the health insurance provider. In general, a submitted health insurance claim includes information identifying the procedures, services, treatments, and/or the like rendered by a healthcare provider to an insured party, along with information identifying one or more diagnoses made by the healthcare provider that facilitated the need for the procedures, services, treatments, and/or the like. Such information is typically conveyed through codes. Specifically, Current Procedure Terminology codes (CPT codes) are a way for a healthcare provider (e.g., a physician) to identify the procedure(s), service(s), treatment(s), and/or the like that he or she provided to a patient for an insurance claim. These codes may come in the form of alphanumeric values, are maintained by the American Medical Association, and are updated on a regular basis. In addition, a modifier code may be provided to indicate a procedure, service, treatment, and/or the like that has been performed has been altered by some specific circumstance but has not changed in its definition or code. International Classification of Diseases codes (ICD codes) identify medical diagnoses and help a health insurance provider understand why the procedure(s), service(s), treatment(s), and/or the like provided by the healthcare provider were necessary. CPT codes and ICD codes oftentimes work in tandem and are normally required on every insurance claim submission. Accordingly, various embodiments of the disclosure may provide a protocol recommendation for a health insurance claim that identifies a recommended configuration of the CPT codes, modifier codes, and/or ICD codes that should be included in the claim so that the claim is processed effectively and efficiently by the health insurance provider without error. Therefore, in this example, the protocol recommendation may be provided to enable the health insurance provider to process the insurance claim in an efficient and reliable manner, especially in instances when the health insurance provider may use automation in processing the claim.

Examples of other applications in which embodiments of the disclosure may be used will come to mind to those of ordinary skill in the art in light of this disclosure. However, to help facilitate the reader's understanding of various embodiments of the disclosure, the example of the application involving the processing of a health insurance claim is used throughout, although those of ordinary skill in the art should understand the use of this example should not be viewed as limiting the scope of the disclosure.

Turning now to FIG. 1, this figure provides an overview of the framework 100 according to various embodiments of the disclosure. Here, a healthcare provider system 101 may be in communication with a pre-submission claim platform 102 that allows the healthcare provider to informally submit an insurance claim and be provided with a protocol recommendation for the insurance claim prior to actually submitting the insurance claim. This can allow the healthcare provider to correct any errors in the insurance claim prior to submission for payment and avoid having the insurance claim denied. For example, the pre-submission claim platform 102 in particular embodiments may be an application-based interface such as a website supporting one or more webpages the healthcare provider system 101 interacts with over a network such as the Internet to submit the insurance claim and receive a protocol recommendation for the insurance claim.

In various embodiments, the framework 100 extracts the claim information from the insurance claim. For instance, the claim information may include a plurality of application codes in the form of codes and/or modifier codes that identify one or more diagnoses of medical conditions the healthcare provider may have made for the insured party and/or one or more medical procedures, services, treatments, and/or the like the healthcare provider may have provided to the insured party to address the one or more medical conditions. For example, the information found in the insurance claim may identify the diagnoses codes (e.g., ICD codes) Dx1 (L57.0) 103*b* for Actinic Keratosis (AK) and Dx2 (L70.0) 103*e* for acne, and the procedure codes (e.g., CPT codes) CPT1 (17000) 103*a* for treatment of AK one lesion, CPT2 (17003) 103*c* for treatment of AK greater than one lesion, CPT3 (99215) 103*f* for high complexity E/M (established patient), and CPT4 (17340) 103*d* for treatment of acne. Accordingly, these codes 103*a-f* represent various codes that may be used by the health insurance provider in determining whether to pay out on the insurance claim, and if so, how much to pay out on the claim.

Therefore, in various embodiments, the framework 100 involves the use of a graph representation data object 104 in evaluating the codes 103a-f found in the insurance claim and their contribution (and correctness) to the insurance claim. For instance, in particular embodiments, the graph representation data object 104 is provided in the form of a graph database. In general, a graph representation data object 104 typically includes three components: code nodes; edges; and edge weights. Therefore, in the example involving insurance claims, the code nodes of the graph representation data object 104 may represent the various codes and/or modifier codes that may be included in health insurance claims such as, the procedure codes, the diagnosis codes, and/or modifier codes previously discussed. Here, the code nodes represent intersections between different medical codes used in evaluating the insurance claims in the form of the codes. The code nodes are connected by edges and an edge represents an association between the two code nodes that are connected via the edge. Therefore, an edge connecting a code node representing a procedure code and a code node representing a diagnosis code may represent an existence of an association between the two codes. Each edge may also be associated with an edge weight that represents the intensity of the association between the two code nodes, and corresponding codes. In some embodiments, this intensity may be represented visually via, for example, a width of the edge, or may be represented by labelling the edge with a value.

Accordingly, in various embodiments, the mapping of the codes to nodes and associations thereof with edges, and corresponding edge weights, into a graph structure leads to a data representation that is more computationally efficient than found in many other conventional data representations. For instance, the use of a graph representation data object allows for relationships of various codes to take on a priority within the data representation on a level of importance equal to that of the various codes, themselves. Here, the edges included in the graph representation data object represent these relationships and allow for the relationships to exist within the graph representation data object 104 in a persistent manner so that they may be queried (e.g., traversed) very quickly. Other conventional data structures such as relational databases do not provide for persistent existence of relationships between data items.

In various embodiments, the framework 100 continues with extracting 105 a portion of the graph representation data object from the graph representation data object that represents the codes 103a-f found in the insurance claim and establishing the intensity of the relationships between the code nodes representing the different codes 103a-f found in the portion of the graph representation data object to demonstrate the edge importance of the various edges in relation to one another. Specifically, in particular embodiments, the framework 100 is configured for generating a quantitative value for each edge found in the portion of the graph representation data object in the form of a synthesized edge weight. As discussed further herein, the synthesized edge weight may then be used in generating an augmented relative importance value for each code node found in the portion of the graph representation data object representing the codes 103a-f found in the insurance claim.

Here, the augmented relative importance value for a code node represents the code node's contribution with respect to strength of relationships with other code nodes found in the portion of the graph representation data object, as well as the number of edges connected to the code node. Accordingly, in various embodiments, the augmented relative importance value defines not only the strength of the code node, but also emphasizes the degree of the code node by taking into consideration the number of edges connected to the code node.

In particular embodiments, the framework 100 makes use of the augmented relative importance values in identifying those code nodes found in the portion of the graph representation data object being used to represent the codes 103a-f found in the insurance claim that should be replaced based at least in part on their strength for replacement by code nodes representing alternative codes. For instance, in some embodiments, the framework 100 is configured to identify a target code node to be replaced 106 based at least in part on the code node having an augmented relative importance value not satisfying a contribution threshold. Therefore, looking at FIG. 1, the framework 100 may identify the code node representing the procedure code CPT3 (99215) 103f for replacement with a substitute code node representing an alternative procedure code.

At this point, in various embodiments, the framework 100 involves identifying one or more substitute code nodes from the graph representation data object that represent alternative procedure codes that may replace the identified procedure code CPT3 (99215) 103f in the insurance claim. For example, the framework 100 may identify procedure codes CPT34 (99214) 107a, CPT33 (99213) 107b, CPT32 (99212) 107c, and CPT31 (99211) 107d. Accordingly, depending on the embodiment, the framework 100 may be configured for using different criteria in identifying the substitute code nodes and corresponding alternative codes such as, for example, those code nodes in close proximity (e.g., connected) to the remaining code nodes found in the portion of the graph representation data object. In some embodiments, the framework 100 may also evaluate the edge weights of the edges connecting other code nodes to the remaining code nodes in identifying the substitute code nodes. For example, the framework 100 may be configured to identify the substitute code nodes as those code nodes found in the graph representation data object that are connected to the remaining code nodes with an edge weight satisfying a threshold value.

Once the substitute code nodes have been identified, the framework 100 in various embodiments is configured to perform iterations 108 in which the code node for the procedure code CPT3 (99215) 103f that is to be replaced is replaced/substituted with a substitute code node for one of the alternative procedure codes 107a-d. As further described herein, each iteration that is performed involves evaluating the variability of the group of code nodes with the substitute code node to identify which of the substitute nodes represents the alternative procedure code 107a-d that is the best option for replacing the procedure code CPT3 (99215) 103f. Specifically, in particular embodiments, the framework 100 is configured to generate a heterogeneity index value for each configuration of the graph representation data object having a substitute code node and identify the configuration of the graph representation data object demonstrating the lowest variability based at least in part on the generated heterogeneity index values. This configuration can then be used in generating the protocol recommendation for the insurance claim to the healthcare provider.

At this point, in various embodiments, the protocol recommendation is shared 109 with the healthcare provider to provide the healthcare provider with a configuration of the codes that should be included in the health insurance claim.

Here, for example, the healthcare provider may be provided the protocol recommendation in the form of the proposed claim protocol 110 having the procedure codes and diagnosis codes that the healthcare provider is recommended to include in the submission of the health insurance claim to help ensure the claim is processed correctly and not denied. Accordingly, in the example, the proposed claim protocol 110 may include the alternative procedure code CPT33 (99213) 107b replacing the procedure code CPT3 (99215) 103f that is found in the old claim information 111. As a result, in various embodiments, the framework 100 can allow for the healthcare provider to correct any errors in the insurance claim prior to submission for payment and avoid having the insurance claim denied. Further detail is now provided on different aspects of the framework 100 according to various embodiments.

Exemplary Technical Contributions

Various embodiments of the present invention introduce techniques for improving graph representation data objects associated with application data objects in order to enhance the utility and reliability of the cross-code relationships described by the noted graph representation data objects. Improved graph representation data objects enable generating improved predictive inferences using application data objects, which in turn leads to a reduction in the number of queries by end users to perform the noted predictive inferences. In other words, in the absence of the improved graph representation data objects, it is expected that predictive data analysis systems that are configured to perform predictive inferences using application data objects will have a higher usage load, which in turn leads to a higher rate of usage of computational resources associated with the noted predictive data analysis systems. In this way, by reducing the computational load on the predictive data analysis systems and reducing the number of processing operations that need to be performed by computational/processing resources associated with the noted predictive data analysis systems, various embodiments of the present invention substantially improve the computational efficiency and reliability of the predictive data analysis systems that are configured to perform predictive inferences using application data objects based on graph representation data objects, and thus make important technical contributions to the fields of predictive data analysis and application-oriented machine learning.

As previously noted, various embodiments of the disclosure provided herein involve identifying a protocol recommendation for an application data object used in performing an application. In general, the application may involve communicating, processing, generating, identifying, and/or the like data that may convey information for different purposes. For example, as previously noted, one such application is the submission of health insurance claims by healthcare providers to health insurance providers for payment. In this example, the protocol recommendation may involve identifying the combination of codes that should be included in the insurance claim submission so that the claim may have the correct information needed for processing the claim for payment.

As previously discussed, a submission of a health insurance claim may include information identifying the procedures, services, treatments, and/or the like rendered by a healthcare provider to a patient, along with information identifying one or more diagnoses made by the healthcare provider that facilitated the need for the procedures, services, treatments, and/or the like. As noted, such information is typically conveyed through codes and/or modifier codes. Specifically, CPT codes and modifier codes are a way for a healthcare provider (e.g., a physician) to identify the procedure(s), service(s), treatment(s), and/or the like that he or she provided to a patient for an insurance claim. While ICD codes identify medical diagnoses and help a health insurance provider understand why the procedure(s), service(s), treatment(s), and/or the like provided by the healthcare provider were necessary.

Accordingly, CPT codes, modifier codes, and/or ICD codes play a very important role in the insurance industry. When going to a healthcare provider for any sort of medical procedure, the amount the patient owes, the amount the health insurance provider pays, and the amount of cuts and reductions that code into that calculation can be very complicated. Typically, a medical insurance adjuster working for the health insurance provider takes these codes into consideration through the use of a specialized software application configured to match a CPT code and/or modifier code within an insurance claim to a specific fee schedule that applies to the state in which the service was provided. This specialized software application is often configured to identify discrepancies between the CPT codes, modifier codes, ICD codes, and/or charges found in health insurance claims and deny them accordingly.

However, the sheer volume of CPT codes, modifier codes, and ICD codes, not to mention the possible combinations of these codes, can prove to be a daunting task for many healthcare providers in ensuring the correct information is provided on insurance claims that are submitted to health insurance providers. For example, two hundred and six new CPT codes and four hundred and ninety new ICD-10-CM codes have been added in 2021 alone. In addition, many of these codes may have miniscule differences between them and can be quite difficult for healthcare providers to distinguish and choose between them. Further, many healthcare providers are required to submit insurance claims to many different health insurance providers and are oftentimes not aware of health insurance providers' views and/or practices in investigating insurance claims that can lead to denying many claims.

Accordingly, many healthcare providers have instituted several technologies to aid them in generating and/or submitting health insurance claims. Such technologies are configured to increase the accuracy, efficiency, and/or quality at various stages of the insurance claim submission process. However, many problems still persist in providing accurate information on health insurance claims that have not been solved through these technologies. As a result, a significant number of health insurance claims are still denied due to discrepancies found in the information provided in such claims. These continued problems can largely be contributed to the volume and complexity of information that is required to be processed in generating and submitting accurate health insurance claims, and the lack of technologies available to aid healthcare providers in identifying accurate information to submit for such claims.

Thus, various embodiments of the disclosure provided herein address many of the technical disadvantages encountered using conventional practices, processes, and technologies for identifying protocol recommendations for application data objects used for performing various applications such as, for example, identifying protocol recommendations of information to submit for health insurance claims based at least in part on protocols put in place by many health insurance providers in processing such claims. Specifically, embodiments of the disclosure provide a novel framework that can be used in representing meaningful parameters of data and/or attributes, as well as the relationships that exist between these parameters of data and/or attributes. More specifically, embodiments of the disclosure provide a novel framework by using graph analytics to impart protocol recommendations through confounding intensity of relationships between codes influencing meaning parameters of data identified in the protocol recommendations. This novel framework can enable computing systems to perform tasks identifying, managing, and evaluating various applications involving the use of application data objects based at least in part on data configurations identified in protocol recommendations in a computationally efficient manner that increases performance of these computing systems. As a result, embodiments of the disclosure can increase the capacity and efficiency of these computing systems.

As previously noted, various embodiments of the framework perform graph analytics making use of a graph representation data object. Accordingly, the use of a graph representation data object in various embodiments allows for a large volume of application codes (e.g., codes) to be represented and managed in an efficient manner. In addition, in various embodiments, the use of a graph representation data object can facilitate a consistent performance in the computational processing of application data objects used in performing various applications for correctness as relationships grow between various application codes. Therefore, embodiments of the disclosure allow for the processing of application data objects for correctness involving big data that may not otherwise be achievable using conventional data representations. For example, queries performed for relational databases are known to slow as relationships between data items (e.g., entities) stored within the databases grow. Various embodiments of the disclosure overcome this technical disadvantage. In addition, the use of a graph representation data object in various embodiments allows for the data structure and schema to grow as more application codes, and/or relationships between entities are introduced, providing for a flexible solution.

Thus, various embodiments of the disclosure provided herein address many of the technical disadvantages encountered using conventional data representations, as well as processing and managing such conventional data representations. Specifically, embodiments of the disclosure provide a novel approach in representing various application codes found in application data objects, as well as the relationships that exist between these various entities. This novel approach can enable computing systems to perform tasks identifying, managing, and evaluating the correctness of data provided in various application data objects in a computationally efficient manner that increases performance of these computing systems. As a result, embodiments of the disclosure can increase the capacity and efficiency of these computing systems.

In addition, various embodiments of the disclosure enable the identification of protocol recommendations for various application data objects that are used for performing different applications that are normally configured by humans to be carried out in an automated fashion without human intervention. For example, various embodiments of the disclosure enable the identification of protocol recommendations for configurations of application data objects used in performing applications (e.g., protocol recommendations for configurations of CPT codes, modifier codes, and ICD codes submit for health insurance claims) based at least in part on configuration protocols put in place for such application data objects without the need for human intervention. Thus, the disclosed solution is more effective, accurate, less error prone, and faster than manual implementations. In addition, various embodiments' implementations reduce the manual effort necessary to identify the protocol recommendations and corresponding configurations for various application data objects using in performing different applications and reduces operational costs and inefficiencies.

Further, the computational processes executed in various embodiments on the volume and complexity of data required for identifying protocol recommendations for various application data objects can carry out complex mathematical operations that cannot be performed by the human mind. Additionally, the solution can reduce the computational load of various systems used in performing tasks by using graph analytics according to various embodiments while marginally affecting the effective throughput of these systems. Accordingly, various embodiments of the present disclosure enhance the efficiency and speed of various computing systems, provide the ability to manage application data object configurations for various applications that may involve very large volumes of complex data, and make important contributions to various computational tasks that utilize real-time/expedited processing of such data. In doing so, various embodiments of the present disclosure make major technical contributions to improving the computational efficiency and reliability of various automated tasks. This in turn translates to more computationally efficient software systems.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 2 illustrates a system architecture that may be used in accordance with the various embodiments of the disclosure. Here, an end-user device 210 is connected to a Web server 220 over a network 215. For instance, in particular embodiments, the end-user device 210 is connecting to the Web server 220 to gain access to one or more webpages hosted by the Web server 220. Depending on the embodiment, the network 215 may include one or more of a cellular network, Internet, intranet, Local Area Network, Wide Area Network, or any other form of connecting two or more systems, components, or storage devices together. Further, depending on the embodiment, the end-user device 210 may be a computer, tablet device, a smartphone, or any other type of computing entity.

For example, the end-user device 210 may be a computing entity being used by a healthcare provider who is accessing the Web server 220 to inquire about recommendations for submitting a health insurance claim. In this example, the Web server 220 may provide access to one or more webpages for a health insurance provider who is to receive the health insurance claim. Therefore, the healthcare provider may be accessing the one or more webpages to gather one or more recommendations on the proper information to submit for the health insurance claim.

Accordingly, in various embodiments, the Web server 220 is configured for receiving requests and serving content in the form of one or more webpages in response to thereof. Depending on the embodiment, the Web server 220 may run any variety of server or mid-tier applications, including Hypertext Transfer Protocol ("HTTP") servers, File Transfer Protocol ("FTP") servers, Computer-Generated Imagery ("CGI") servers, data servers, Java servers, and business application servers. Here, the server(s) 220 may be capable of executing programs and/or scripts in response to requests from the end-user device 210, such as executing one or more Web applications that may be implemented as one or more scripts and/or programs written in an appropriate programming language such as, for example, Java, C, C#, or C++, or scripting language such as, for example, Perl, Python, or TCL.

The architecture shown in FIG. 2 also includes an application server 225 and data store 230. Although only a single application server 225 and data store 230 are shown, it should be understood that several application servers, data stores, layers, and/or other components may be involved, which may be chained or otherwise configured to interact and/or perform tasks. Specifically, the application server 225 may include any appropriate hardware and/or software for interacting with the Web server 220 and/or the data store 230 as needed to execute aspects of one or more applications for the end-user device 210 and handling data access and business logic for an application. Furthermore, the data store 230 may be a device or any combination of devices capable of storing, accessing, and retrieving data. For instance, depending on the embodiment, the data store 230 may comprise any combination and number of data servers and data storage media in any standard, distributed, or clustered configuration. In various embodiments, the application server 225 provides access control services in cooperation with the data store 230 and is configured to generate content such as text, graphics, audio and/or video to be transferred to the end-user device 210 via the Web server 220 in an appropriate, structured language such as, for example, Hypertext Markup Language ("HTML") and/or eXtensible Markup Language ("XML").

Exemplary Computing Entity

FIG. 3 provides a schematic of a computing entity 300 that may be used in accordance with various embodiments of the present disclosure. For instance, the computing entity 300 may be one or more of the Web server 220 and/or the application server 225, and in some instances the end-user device 210, previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and, in a general sense, to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Graph Representation Data Object

As previously noted, various embodiments of the framework 100 involve the use of a graph representation data object to represent the various application codes that may be found in the application data object of interest. For instance, in the example involving health insurance claims, the graph representation data object is configured in various embodiments to represent (illustrate) relationships between the different medical codes used in evaluating health insurance claims (e.g., procedure codes, modifier codes, diagnosis codes, and/or the like) separately as nodes, with each node representing one or more attribute properties and related dynamics. Turning now to FIG. 4, a process 400 is provided for generating a graph representation data object in accordance with various embodiments of the present disclosure. Again, for convenience, the application data object and application codes described are health insurance claims and information provided in the claims in the form of procedure codes, modifier codes, diagnosis codes, and/or the like. The combination of codes found in an insurance claim is oftentimes a significant contributor in whether the claim is processed or denied, as well as the amount of payment made on the claim by a health insurance provider.

Accordingly, in various embodiments, the purpose of the graph representation data object is to represent best practices of billing patterns for medical codes (e.g., procedures, services, treatments, and/or the like) based at least in part on historical claim information provided by healthcare providers on various claims. Therefore, in particular embodiments, each medical code (e.g., procedure code, modifier code, diagnosis code, combination thereof, and/or the like) considered by a health insurance provider in processing a health insurance claim is represented as a separate node in the graph representation data object. The different nodes are then linked to each other through edges. The edges represent relationships (associations) between codes and include edge weights representing the intensity of the relationships between codes. Thus, the graph representation data object can be viewed as a graphical representation of insurance claim attributes representing codes used by a health insurance provider in processing the claims.

Therefore, the process 400 may initially involve identifying and establishing the relationships between the various codes, both via intra-relationships between similar codes (e.g., between procedure codes) and inter-relationships between different types of codes (e.g., between procedure codes and diagnosis codes). Here, in particular embodiments, various data may be gathered from different data sources (e.g., relational databases) 410. For example, the various data may include data on insured members for the health insurance provider, data on healthcare providers, data on past submission of health insurance claims, data on prescriptions, data on various demographics, and/or the like. Once the data is gathered, the process 400 may include a relationship determination process 415 that involves identifying and establishing relationships between the various codes found in the gathered data.

For instance, in the example involving health insurance claims, the process 400 may involve identifying and establishing the intra-relationships found within each type of code and modifier code and the inter-relationships found between different types of codes and modifier codes. In some embodiments, the codes may be amalgamated 420 to form a data structure 425 that is stratified, indexed, and stored for further processing. For instance, in the described example, the stratification of the codes and/or modifier codes may involve segregating the data for the different codes and/or modifier codes into groups based at least in part on elements such as age, gender, location, combination thereof, and/or the like. Therefore, stratification can allow for treating each type of code by incorporating layers of stratum and/or combinations thereof. That is to say, stratification can allow for creation of a more optimal graph representation data object by minimizing the heterogeneity within the data object.

Next, the process 400 continues with identifying individual codes (e.g., the individual procedure codes, diagnosis codes, and modifier codes) found in the indexed data structure 425 that can be treated as an code node, as well as known relationships between the individual codes that can be treated as possible edges, and labeling each individual code and/or known relationship with one or more attribute properties for the code and/or known relationship. Accordingly, the one or more attribute properties for an individual code and/or known relationship may represent various characteristics, traits, features, qualities, and/or the like exhibited by the code and/or known relationship, and the one or more attribute properties may be marked with one or more values (e.g., cardinality values) providing quantitative representations for the characteristics, traits, features, qualities, and/or the like.

For instance, a key attribute property for a code serving as a meaningful code may be the unique members who are associated with the code. For example, a diagnosis code may have an attribute property for unique members who have been diagnosed with the medical condition associated with the diagnosis code. Accordingly, this attribute property may be marked with a value providing the number of unique members who have been diagnosed with the medical condition associated with the diagnosis code. In other words, the attribute property may be marked with the number of unique members who have had an insurance claim submitted by a healthcare provider having the diagnosis code.

Likewise, a procedure code may have an attribute property for unique members who have been provided the procedure, service, treatment, and/or the like associated with the procedure code. Accordingly, the attribute property may be marked with a value providing the number of unique members who have received the associated procedure, service, treatment, and/or the like from a healthcare provider. In other words, the attribute property may be marked with the number of unique members who have had an insurance claim submitted by a healthcare provider having the procedure code.

Similarly, a known relationship between a diagnosis code and a procedure code may have an attribute property for the members who have been both diagnosed with the medical condition associated with the diagnosis code and received the procedure, service, treatment, and/or the like associated with the procedure code. Here, the attribute property may be marked with a value providing the number of members in common between the two codes. In other words, the attribute property for the known relationship may be marked with the number of common members who have had one or more insurance claims submitted having the diagnosis code and/or the procedure code. Here, depending on the embodiment, the value may represent the number of members who have had the diagnosis code and the procedure code submitted on a single insurance claim and/or who have had the diagnosis code and the procedure code submitted on different insurance claims.

At this point, the process 400 continues with constructing the graph representation data object using the indexed data structure 425. Therefore, in particular embodiments, the meaningful codes identified in the indexed data structure 425, along with the known relationships and attribute properties, are used in constructing the graph representation data object. For example, the process 400 may involve constructing the graph representation data object from the codes 430 and known relationships 435 between the codes 430 found in the indexed data structure 425 to create the code nodes 445 and edges 440 in the graph representation data object 450. Accordingly, in particular embodiments, the process 400 may be carried out to include the code nodes 445 and/or edges 440 in the graph representation data object 450 based at least in part on some type of criteria. For instance, one or more of the attribute properties and/or corresponding values for the attribute properties may be evaluated in determining whether a code node and/or edge should be included in the graph representation data object. For example, in some embodiments, a value for an attribute property associated with a known relationship between two codes (e.g., the number of common members) may need to satisfy a threshold for an edge connecting the code nodes representing the codes to be included in the graph representation data object 450. Likewise, a value for an attribute property associated with a code (e.g., the number of unique members who have been associated with the code) may need to satisfy a threshold for a code node representing the code to be included in the graph representation data object 450.

In addition, in various embodiments, the process 400 may involve generating edge weights for each of the edges 440 included in the graph representation data object 450. Accordingly, in particular embodiments, an edge weight for an edge is used to quantify the qualitative relationship between the codes represented by the code nodes connected by the edge in a numeric form to identify the intensity of the relationship (association) between the two codes. In other words, the edge weight can represent the strength of the relationship that exists between the codes in a quantitative manner.

For instance, in particular embodiments, the edge weight for an edge between two code nodes is generated based at least in part on a number of common instances of an attribute property between the two code nodes connected through edge ($\lceil M_i \cap M_j \rceil$) and a number of unique instances of the attribute property across the two code nodes connected through edge ($|M_i \cup M_j|$). In this instance, the edge weight ($w_{ij}$) for the edge is generated as $\lceil M_i \cap M_j \rceil / |M_i \cup M_j|$, ($0 \leq w_{ij} \leq 1$ and $i > j$). Here, for example, the number of common instances of the attribute property may be the number of common members between the two codes represented by the code nodes connected by the edge, and the number of unique instances of the attribute property may be the number of unique members across the two codes represented by the code nodes connected by the edge.

Depending on the embodiment, the edge weight can represent different relationships in different scenarios such as, for example, cost, distance, capacity, and/or the like. However, in the described example, the edge weight in various embodiments represents the intensity (e.g., strength) of the relationship between two codes that are linked based at least in part on the number of common members. Accordingly, the more common members that exist between the two codes, the higher the edge weight, and the stronger the bond between the two codes.

In addition to edge weight, a degree may be assigned to each code node 445 in the graph representation data object 450 to represent the importance of the code node 445. For instance, in particular embodiments, the degree of a code node 445 may be defined as the number of its neighbor code nodes 445, that is the number of edges 440 connected to the code node 445 ($D(i) = \Sigma_{j=1}^{N} e_{ij}$).

Accordingly, in various embodiments, the indexed data structure 425 may be provided in the form of one or more indexed data structure matrices that provide a numerical representation of the graph representation data object 450. This representation may help to facilitate/expedite generating the graph representation data object 450. Specifically, in particular embodiments, an incidence matrix may be used. Here, the incidence index may be a one-dimensional matrix that identifies the existence of relationships between code nodes 445 and edges 440 to be included in the graph representation data object 450. Accordingly, the incidence matrix may include elements, each element having a value (e.g., a binary value, such as one or zero) for each combination of code node 445 and edge 440 that indicates whether the code node 445 is connected to the edge 440. In some embodiments, an incidence matrix may be generated for each type of code node 445. For example, a first incidence matrix may be generated to identify the relationships between the code nodes 445 representing the different procedure codes, a second incidence matrix may be generated to identify the relationships between the code nodes 445 representing the different diagnosis codes, and a third incidence matrix may be generated to identify the relationships between the code nodes 445 representing the different modifier codes. In addition, in some embodiments, a layer may be generated for the incidence matrix for each stratum of a type of code node 445, thus resulting in a multi-layer incidence matrix having a layer for each stratum. An example of an incidence matrix 500 is provided in FIG. 5A. In this example, the incidence matrix 500 represents the code nodes 445 for procedure codes. Accordingly, the use of the incidence matrix 500 in various embodiments can facilitate the identification of edges 440 establishing relationships between code nodes 445, thus improving the computational efficiency in identifying such relationships.

In addition, in particular embodiments, an adjacency matrix may be used. The adjacency matrix may include elements each having a value (e.g., a binary value, such as one or zero) for each combination of code nodes 445 that indicates whether the code nodes 445 are connected to each other. Again, in some embodiments, an adjacency matrix may be generated for each type of code node 445, as well as generated as a multi-layer adjacency matrix with a layer for each stratum for a type of code node 445. An example of an adjacency matrix 510 is shown in FIG. 5B. Again, in this example, the adjacency matrix 510 represents the code nodes 445 for procedure codes. Accordingly, similar to the incidence matrix 500, the adjacency matrix 510 can facilitate the identification of code nodes 445 having relationships, and therefore can also improve the computational efficiency of identifying such node relationships.

Further, in particular embodiments, an N-dimensional matrix may be used that represents the relationships between the different types of code nodes 445 (e.g., represents the relationships between the multi-dimensional code nodes 445). For example, the code nodes 445 may be multi-dimensional in the sense that they represent different types of codes such as procedure codes, modifier codes, and diagnosis codes. Therefore, turning to FIG. 6A, an N-dimensional matrix 600 can be constructed to represent the different relationships of the procedure codes 610, diagnosis codes 615, and modifier codes 620, both intra-relationships between similar types of codes and inter-relationships between different types of codes. Therefore, as shown in FIG. 6A, the N-dimensional matrix 600 is constructed in this example to demonstrate the intra-relationships 625 between the procedure codes 610, the intra-relationships 630 between the modifier codes 620, the inter-relationships 635 between the procedure codes 610 and the diagnosis codes 615, the intra-relationships 640 between the diagnosis codes 615, and the inter-relationships between the procedure codes 610, diagnosis codes 615, and the modifier codes 620. Again, the N-dimensional matrix may be generated in some embodiments to include a layer for each stratum for a type of code node 445. Thus, similar to the incidence matrix 500 and/or the adjacency matrix 510, such a matrix 600 can facilitate the identification of the various code nodes 445 representing different types of codes 610, 615 and/or modifier codes 620 having relationships, and therefore can also improve the computational efficiency of identifying such relationships.

Further, in instances in which a large number of nodes are present in the graph representation data object 450, a matrix representation may be used in particular embodiments to reduce the complexity of the indexed data structure 425 and to represent the importance and inter-relationships of different types of codes (nodes). As shown in FIG. 6B, in the case of M code nodes 445, a matrix 645 of size N×N (N-rows and N-columns), known as a permanent function may be utilized. Here, each code node 445 may be associated with its importance (degree D(i)), represented as a diagonal element Ai 650, and relative importance, represented as an off diagonal element $a_{ij}$ 655. Accordingly, in some embodiments, the relative importance may be calculated as $a_{ij}=w_{ij}/\Sigma_{ij}^{N}w_{ij}$. In addition, the relative importance of i,j and j,i can be defined as $a_{ij}=1/a_{ji}$.

Finally, in particular embodiments, one or more of the matrices may be used for representing the graph representation data object from which the portion of the graph representation data object is extracted as described further herein. For example, in some embodiments, the application codes (e.g., the procedure codes, diagnosis codes, and/or modifier codes) may be extracted from the health insurance claim information and the portion of the graph representation data object representing the extracted application codes may be extracted directly from the matrices. Therefore, in these particular embodiments, the one or more matrices may serve as another form of a graph representation data object.

Protocol Recommendation Module

Turning now to FIG. 7, additional details are provided regarding a process 700 for generating a protocol recommendation for an application data object according to various embodiments. FIG. 7 is a flow diagram showing a protocol recommendation module for performing such functionality according to various embodiments of the disclosure. For example, the flow diagram shown in FIG. 7 may correspond to operations carried out by a processing element 310 in a computing entity 300, such as an application server 225 described in FIG. 2, as it executes operations associated with the protocol recommendation module stored in the computing entity's volatile and/or nonvolatile memory.

As previously noted, a party may interested in obtaining a protocol recommendation for an application data object that is used in performing an application. For example, the application may be the processing of in insurance claim by a health insurance provider. Here, the application data object is the insurance claim, and a healthcare provider who is submitting the insurance claim may wish to get a protocol recommendation on the diagnosis codes, procedure codes, and/or modifier codes to include in the insurance claim to ensure the insurance claim is processed properly by the health insurance provider and is not denied. Therefore, the healthcare provider may visit an application-based interface such as a website for the health insurance provider and submit the information (e.g., combination of suggested diagnosis codes, procedure codes, and/or modifier codes) for the insurance claim and, as a result, the protocol recommendation module may be invoked to process the information and provide a protocol recommendation for the insurance claim.

Therefore, the process 700 begins in various embodiments with the protocol recommendation module extracting the application codes from the data (information) for the application data object in Operation 710. Therefore, in the example involving the insurance claim, the protocol recommendation module extracts the one or more diagnosis codes, procedure codes, and/or modifier codes from the data. Once the application codes have been extracted, the protocol recommendation module extracts a portion of the graph representation data object to represent the extracted application codes in Operation 715. Thus, in the example, the protocol recommendation module extracts the nodes found in the graph representation data object and corresponding edges that represent the one or more diagnosis codes, procedure codes, and/or modifier codes that have been extracted from the data provided by the healthcare provider for the insurance claim.

As previously noted, in particular embodiments, the graph representation data object may be configured in particular embodiments based at least in part on one or more strata to help minimize heterogeneity within the graph representation data object. For example, the graph representation data object may be generated based at least in part on stratification codes such as age codes, gender codes, location codes, and/or the like for a graph representation data object to be used in generating protocol recommendations for health insurance claims. Therefore, in these particular embodiments, the protocol recommendation module may be configured to extract the portion of the graph representation data object from the corresponding stratum of the graph representation data object based as least in part on additional data (information) found in the application data object. For example, the protocol recommendation module may extract the portion of the graph representation data object based at least in part on age codes, gender codes, location codes, and/or the like determined based at least in part on the data for the health insurance claim.

At this point, in various embodiments, the protocol recommendation module generates a synthesized edge weight for each of the edges found in the portion of the graph representation data object in operation 720. As previously noted, in particular embodiments, each of the edges found in the graph representation may be assigned an edge weight identifying the intensity (e.g., strength) of the relationship between the two code nodes (e.g., the two codes/modifier codes) that are connected via the edge. For instance, the edge weight for an edge may be based at least in part on a ratio of the number of common members between the two code nodes to the number of total unique members for the two code nodes. Accordingly, such an edge weight is focused on weighted local similar indices. Therefore, in various embodiments, a synthesized edge weight is generated for each edge in the portion of the graph representation data object extracted to represent the application codes found in the application data object to incorporate variation found in the portion of the graph representation data object by smoothing the edge weights. In some embodiments, each synthesized edge weight is generated based at least in part on a smoothed edge weight for the edge associated with the synthesized edge weight.

For example, two code nodes found in the portion of the graph representation data object may represent the diagnosis code Dx1 and procedure code CPT1. Here, each of the codes may have two hundred members, whereas the combination of the two codes may have one hundred and sixty members in common. In addition, two other code nodes found in the portion of the graph representation data object may represent the diagnosis code of Dx2 and procedure code CPT2. Here, each of the codes may have one thousand members, whereas the combination of the two codes may have eight hundred members in common. Therefore, the edge weights connecting the code nodes for each pair of codes would be 0.8 indicating a high interaction, which does not integrate the higher number of members involved in the first pair. Therefore, in this example, synthesized edge weights may be used for edges instead of edge weights to allow for the edges to be distinguished from each other based at least in part on the variability found in the portion of the graph representation data object and strength of the code nodes for different combinations of code nodes found in the portion of the graph representation data object.

Thus, in particular embodiments, the synthesized edge weights are determined by using structural properties of common neighbors found in the portion of the graph representation data object, as different common neighbors may have different contributions on the connection likelihood. Specifically, in particular embodiments, the synthesized edge weight ($sw_{ij}$) quantifies the edge importance in relation to the other edges found in the portion of the graph representation data object in accordance with the below equation:

$$sw_{ij}=[\overline{w}\times\text{Min}(|M_i \cap M_j|)+|M_i \cap M_j|]/ [|M_i \cup M_j|+\sigma_w \times \text{Max}(|M_i \cap M_j|)], \quad \text{Equation 1}$$

In Equation 1, $\overline{w}$ and $\sigma$ are a weighted average and a standard deviation of the edge weights for the plurality of edges found in the portion of the graph representation data object described in [0083], $\text{Min}(|M_i \cap M_j|)$ is a minimum number of common instances of an attribute property between two code nodes found in the portion of the graph representation data object that are connected to an edge (e.g., minimum number of common members between two nodes found in the portion of the graph representation data object), and $\text{Max}(|M_i \cap M_j|)$ is a maximum number of common instances of the attribute property between two code nodes found in the portion of the graph representation data object that are connected to an edge (e.g., maximum number of common members between two nodes found in the portion of the graph representation data object).

Briefly turning to FIGS. 8A and 8B, an example of a portion of the graph representation data object is provided demonstrating edge weights and synthesized edge weights. FIG. 8A displays the relationships between the code nodes of the portion of the graph representation data object through edge weights. Here, the edge 800 between the code nodes CPT1 and CPT4 has the same edge weight (e.g., 0.20) as the edge 810 between the code nodes CPT3 and Dx1, indicating the same intensity of relationship between CPT1 with CPT4 and CPT3 with Dx1. However, the synthesized edge weights assigned to the edges can allow for differentiation between the edges. Therefore, FIG. 8B displays the relationships between the code nodes of the portion of the graph representation data object through synthesized edge weights. Now, the edge 800 between the code nodes CPT1 and CPT4 has a synthesized edge weight (e.g., 0.19), which is different from the edge 810 between the code nodes CPT3 and Dx1 (e.g., 0.18).

Returning to FIG. 7, the protocol recommendation module then generates an augmented relative importance value for each of the code nodes found in the portion of the graph representation data object in Operation 725. In identifying the protocol recommendation, a need exists for identifying any of the code nodes that need to be replaced/corrected. For instance, returning to the example involving the insurance claim, a need exists to identify any of the diagnosis codes, procedure codes, and/or modifier codes that need to be replaced/corrected in the insurance claim prior to submission. Therefore, in various embodiments, an augmented relative importance value is determined for each code node that is based not only on the strength of the code node, but also emphasizes the degree (i.e., importance) of the code node. Accordingly, the augmented relative importance value (ARIMi) may describe the contribution of a code node with respect to the strength of relationships and number of edges connected to the code node and is determined in particular embodiments in accordance with the below equation:

$$ARIMi = Di \Big/ \sum_{i=1}^{m} Di, \quad \text{Equation 2}$$

In Equation 2, $$Di = \sum_{j=1}^{n} sw_{ij} \times Ni, \quad \sum_{j=1}^{n} sw_{ij}$$

is the sum of the synthesized edge weights for the code node, Ni is the number of edges connected to the code node, and $$\sum_{i=1}^{m} Di$$

is the sum of all Dis for the plurality of code nodes found in the portion of the graph representation data object.

Accordingly, the augmented relative importance value assigns a different value of contribution to each code node found in the portion of the graph representation data object. Thus, in various embodiments, the augmented relative importance values for the different code nodes can be used in identifying the weak (or strong) code nodes based at least in part on their strength of alternatives. Therefore, in various embodiments, the protocol recommendation module uses the augmented relative importance values for the various code nodes in identifying those code nodes that should be replaced in Operation 730.

For instance, turning briefly to FIGS. 9A and 9B, an example of a portion of a graph representation data object is provided with relative importance values for the code nodes in FIG. 9A and augmented relative importance values for the code nodes in FIG. 9B. As shown, the relative importance values for the CPT1-17000 code node 900 and the CPT2-17003 code node 910 are the same. However, the augmented relative importance values for the two code nodes 900, 910 are different, allowing for an evaluation of the importance of the two code nodes 900, 910 with respect to each other.

Depending on the embodiment, the protocol recommendation module may be configured using various criteria to identify the one or more code nodes that should be replaced. For instance, in particular embodiments, the protocol recommendation module may be configured to identify the one or more code nodes based at least in part on the code node(s) failing to satisfy a contribution threshold. For example, the protocol recommendation module may be configured to identify the code node having the lowest augmented relative importance value, the code nodes having an augmented relative importance value below a threshold value, and/or the like. Those of ordinary skill in the art can envision several types of criteria that may be used in identifying code nodes to replace in light of this disclosure. Therefore, looking at FIG. 9B, the protocol recommendation module may identify the CPT3-99215 code node 915, having the lowest augmented relative importance value, as the code node needing to be replaced.

Returning to FIG. 7, the protocol recommendation module determines whether any code nodes have been identified to be replaced in Operation 735. If so, then the protocol recommendation module selects one of the code nodes that is to be replaced in Operation 740. The protocol recommendation module then generates a replacement configuration for the portion of the graph representation data object associated with the replaceable code node by replacing the code node with a substitute code node in Operation 745. Accordingly, in the example involving the insurance claim, the substitute code node represents an alternative code to replace the code represented by the code node selected to be replaced. In particular embodiments, the protocol recommendation module performs this operation by invoking a replacement module (FIG. 10). In turn, the replacement module identifies one or more substitute code nodes from the graph representation data object that may be used to replace the code node selected to be replaced, and then determines which of the substitute code nodes should replace the code node in the portion of the graph representation data object.

Once the replacement configuration has been generated, the protocol recommendation module determines whether another code node found in the portion of the graph representation data object needs to be replaced in Operation 750. If so, then the protocol recommendation returns to Operation 740, selects the next code node that is to be replaced, and generates a replacement configuration for the portion of the graph representation data object associated with the replaceable code node based at least in part on the selected code node. Once the protocol recommendation module processes all of the code nodes that need to be replaced in the portion of the graph representation data object, the protocol recommendation module provides the protocol recommendation for the application data object in Operation 755. Accordingly, in various embodiments, the protocol recommendation is based at least in part on the final replacement configuration of the graph representation data object. If the protocol recommendation module determines that no code nodes have been identified to be replaced in Operation 735, the protocol recommendation module does not generate any recommendations in Operation 736 before exiting the process 700.

Therefore, in the example involving the insurance claims, the protocol recommendation includes the diagnosis codes, procedures codes, modifier codes, and/or like represented by the code nodes found in the final replacement configuration of the graph representation data object, or original configuration of the graph representation data object if no code nodes need replacing. Thus, the codes represented by the one or more code nodes identified to be replaced are now replaced with alternative codes based at least in part on the substitute code nodes found in the replacement configuration of the graph representation data object. As a result, the healthcare provider can now submit the health insurance claim based at least in part on the protocol recommendation with a better level of assurance the insurance claim will be processed by the health insurance provider for payment without being denied.

Replacement Module

Turning now to FIG. 10, additional details are provided regarding a process flow for generating a replacement configuration according to various embodiments. FIG. 10 is a flow diagram showing a replacement module for performing such functionality according to various embodiments of the disclosure. For example, the flow diagram shown in FIG. 10 may correspond to operations carried out by a processing element 310 in a computing entity 300, such as an application server 225 described in FIG. 2, as it executes operations associated with the replacement module stored in the computing entity's volatile and/or nonvolatile memory.

As previously noted, in various embodiments, the replacement module may be invoked by the protocol recommendation module to generate a replacement configuration of a portion of a graph representation data object. However, with that said, the replacement module may be invoked by a different module or may be executed as a stand-alone module in other embodiments.

The process 1000 begins with the replacement module receiving the code node to be replaced (i.e., the replaceable code node) and corresponding data associated with the replaceable code node in Operation 1010. Thus, in various embodiments, the data may include the portion of the graph representation data object, as well as the information identifying the stratum of the graph representation data object that should be used in identifying substitute code nodes for the code node that is to be replaced. Therefore, the replacement module identifies one or more substitute code nodes from the graph representation data object for the code node that is to be replaced in Operation 1015.

Accordingly, depending on the embodiment, the replacement module may be configured to identify the one or more substitute code nodes using different criteria. For instance, in particular embodiments, the replacement module may identify code nodes found in the graph representation data object that are the same type of code node as being replaced and have a relationship with one or more of the other code nodes found in the portion of the graph representation data object. In some embodiments, the replacement module may be configured to identify those code nodes having an association with the code node that satisfy a strength requirement (e.g., identify those code nodes having an edge weight for edges connecting the code nodes to the replaceable code node that satisfies an edge weight threshold). In some embodiments, the replacement module may be configured to identify those code nodes having a degree satisfying a degree threshold. As those of ordinary skill in the art will recognize, other criteria may be used in identifying the one or more substitute code nodes.

At this point, the replacement module performs one or more heterogeneity determination iterations based at least in part on the number of substitute code nodes identified as possible replacements for the code node to be replaced to determine which of the substitute nodes should be used for replacing the replaceable code node in the portion of the graph representation data object. Therefore, the replacement module generates a potential replacement configuration for the portion of the graph representation data object with the code node being replaced with one of the identified substitute code nodes in Operation 1020. The replacement module then generates synthesized edge weights for each of the edges found in the potential replacement configuration of the graph representation data object in Operation 1025. Thus, the synthesized edge weights for the edges are now based at least in part on the potential replacement configuration with the code node replaced with the substitute node.

Accordingly, in various embodiments, the replacement module then makes use of a measure to evaluate the variability of the arrangements of replacement code nodes now described by the potential replacement configuration for the portion of the graph representation data object. In particular embodiments, this measure is a heterogeneity index value. Therefore, in these particular embodiments, the replacement module generates the heterogeneity index value for the potential replacement configuration in Operation 1030. Specifically, in some embodiments, the replacement configuration generates the heterogeneity index value (HI) in accordance with the below elution:

$$HI = \mathrm{SQRT}(\Sigma_{ij} WT_{ij} \times (sw_{ij} - \overline{swt})^2 / \Sigma_{ij} WT_{ij})$$  Equation 3

The term of Equation 3 have their corresponding descriptions as provided above in relation to Equation 1 and Equation 2. In Equation 3, $\overline{swt}$ is weighted average of synthesized edge weight as described with reference to Equation 1. Weights can be defined as a number of unique number of instances (members) of attribute property across the two nodes connected through edges described previously while calculating $\overline{swt}$. Also the same above-provided definition of weight ($WT_{ij}$) can be applied while generating HI.

Once generated, the replacement module determines whether another substitute code node has been identified as a potential replacement for the code node in Operation 1035. If so, then the replacement module returns to Operation 1020, generates a new potential replacement configuration based at least in part on the next substitute code node, and generates a heterogeneity index value for the new potential replacement configuration of the graph representation data object accordingly.

Once the replacement module has generated a heterogeneity index value for each potential replacement configuration of the graph representation data object based at least in part on replacing the code node with a substitute code node, the replacement module selects one of the potential replacement configurations as the replacement configuration for the portion of the graph representation data object based at least in part on the heterogeneity index values in Operation 1040. For instance, in particular embodiments, the replacement module selects the replacement configuration for the portion of the graph representation data object having a heterogeneity index value satisfying a replacement threshold. Generally speaking, the smaller the heterogeneity index value is for a replacement configuration of the graph representation data object, the less variability is found in the group of replacement code nodes that make up the replacement configuration. Thus, in some embodiments, the replacement module may be configured to select the replacement configuration having the smallest heterogeneity index value and/or a heterogeneity index value below a threshold heterogeneity index value as the recommended replacement configuration of the graph representation data object for replacing the code node that has been identified to replace. However, in other embodiments, other criteria may be used in defining the replacement threshold. In some embodiments, the protocol recommendation includes two or more replacement configurations that satisfy a replacement threshold.

FIG. 11 provides an example of performing heterogeneity determination iterations for a plurality of substitute code nodes identified as possible replacements for a code node according to various embodiments. Here, the healthcare provider claim information 1100 includes two diagnosis codes (e.g., DX1 (L57.0)=Actinic Keratosis (AK) and Dx2 (L70.0)=Acne) and four procedure codes (e.g., CPT1 (17000)=Treatment of AK one lesion, CPT2 (17003)=Treatment of AK greater than one lesion, CPT3 (99215)=High complexity E/M, and CPT4 (17340)=Treatment of Acne). The combination of extracted application codes is represented by a portion of the graph representation data object 1110, and the code node 1111 for the CPT3 (99215) procedure code is identified to be replaced (e.g., has the lowest augmented relative importance value). Accordingly, four substitute code nodes 1112, 1113, 1114, 1115 are identified representing possible replacement procedure codes for the CPT3 (99215) procedure code.

Therefore, a first iteration 1120 is performed in which the code node 1111 for the CPT3 (99215) procedure code is replaced with the substitute code node 1112 for the CPT3 (99211) procedure code, and a heterogeneity index value 1125 of 0.234 is generated for the potential replacement configuration of the graph representation data object having a group of replacement code nodes that includes the substitute code node 1112 for the CPT2 (99211) procedure code. Next, a second iteration 1130 is performed in which the code node 1111 for the CPT3 (99215) procedure code is now replaced with the substitute code node 1113 for the CPT3 (99212) procedure code, and a heterogeneity index value 1135 of 0.231 is generated for the potential replacement configuration of the graph representation data object having a group of replacement code nodes that includes the substitute code node 1113 for the CPT2 (99212) procedure code. Similarly, a third iteration 1140 is performed in which the code node 1111 for the CPT3 (99215) procedure code is now replaced with the substitute code node 1115 for the CPT3 (99214) procedure code, and a heterogeneity index value 1145 of 0.201 is generated for the potential replacement configuration of the graph representation data object having a group of replacement code nodes that includes the substitute code node 1115 for the CPT2 (99214) procedure code. Finally, a fourth iteration 1150 is performed in which the code node 1111 for the CPT3 (99215) procedure code is now replaced with the substitute code node 1114 for the CPT3 (99213) procedure code, and a heterogeneity index value 1155 of 0.175 is generated for the potential replacement configuration of the graph representation data object having a group of replacement code nodes that includes the substitute code node 1114 for the CPT2 (99213) procedure code.

In some embodiments, the conclusion of the heterogeneity determination iterations, the potential replacement configuration having the group of replacement code nodes that includes the substitute code node 1114 for CPT3 (99213) procedure code is identified as the recommended replacement configuration for the portion of the graph representation data object to replace the code node 1111 representing the CPT3 (99215) procedure code. This is because this particular replacement configuration has the lowest heterogeneity index value, indicating the replacement configuration has the least variability among the group of replacement code nodes for all the replacement configurations of the portion of the graph representation data object. Therefore, in this example, if the only code identified to replace is the CPT3 (99215) procedure code, then the protocol recommendation returned to the healthcare provider would be a configuration of recommended application codes for the insurance claim that includes the codes CPT1 (17000), CPT2 (17003), CPT3 (99213), and CPT4 (17340).

CONCLUSION

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   determining, by one or more processors, a plurality of application codes for an application data object;
   determining, by the one or more processors, a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes;
   identifying, by the one or more processors, a replaceable code node of the plurality of code nodes, wherein identifying the replaceable code node comprises:
     generating an augmented relative importance value for each particular code node of the plurality of code nodes based at least in part on a synthesized edge weight for each edge of the plurality of edges connected to the particular code node, and
     identifying the replaceable code node based at least in part on a subset of the plurality of code nodes, where the augmented relative importance value for the replaceable code node in the subset satisfies a contribution threshold; and
   responsive to identifying the replaceable code node:
     determining, by the one or more processors, one or more substitute code nodes of the plurality of code nodes from the graph representation data object, wherein each substitute code node of the one or more of substitute code nodes represents a substitute application code one of the plurality of application codes represented by the replaceable code node,
     determining, by the one or more processors, a replacement configuration of the graph representation data object, wherein the replacement configuration is characterized by a target substitute code node of the one or more substitute code nodes, and
     generating, by the one or more processors, a protocol recommendation for the application data object based at least in part on the replacement configuration.

2. The computer-implemented method of claim 1 further comprising generating, by the one or more processors, the synthesized edge weight for each edge of the plurality of edges based at least in part on one or more attribute properties for the two code nodes of the plurality of code nodes connected to the edge.

3. The computer-implemented method of claim 2, wherein each synthesized edge weight is generated based at least in part on a smoothed edge weight for the edge associated with the synthesized edge weight.

4. The computer-implemented method of claim 1, wherein determining the replacement configuration comprises:
   performing, by the one or more processors, a plurality of heterogeneity determination iterations for the one or more of substitute code nodes to generate a plurality of heterogeneity index values, wherein: (i) each heterogeneity determination iteration is associated with a substitute code node of the one or more of substitute code nodes, and (ii) performing one of the plurality of heterogeneity determination iterations comprises:
     generating a potential replacement configuration of the graph representation data object by replacing the replaceable code node with the substitute code node that is associated with the heterogeneity determination iteration;
     generating a synthesized edge weight for each edge of the plurality of edges connected to the substitute code node in accordance with the potential replacement configuration; and
     generating a heterogeneity index value for the potential replacement configuration based at least in part on each synthesized edge weight; and
   identifying, by the one or more processors, the replacement configuration of the graph representation data object based at least in part on the potential replacement configuration that has the heterogeneity index value which satisfies a replacement threshold.

5. The computer-implemented method of claim 4, further comprising:
   generating, by the one or more processors, user interface data for an application-based interface identifying the protocol recommendation for the application data object.

6. The computer-implemented method of claim 5, wherein the application-based interface comprises one or more webpages provided for display through a browser residing on an end-user computing device.

7. An apparatus comprising one or more processors and at least one memory including program code, the at least one memory and the program code configured to, with the one or more processors, cause the apparatus to at least:
   determine a plurality of application codes for an application data object;
   determine a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes;
   identify a replaceable code node of the plurality of code nodes, wherein identifying the replaceable code node comprises:
     generating an augmented relative importance value for each particular code node of the plurality of code nodes based at least in part on a synthesized edge weight for each edge of the plurality of edges connected to the particular code node, and
     identifying the replaceable code node based at least in part on a subset of the plurality of code nodes, where the augmented relative importance value for the replaceable code node in the subset satisfies a contribution threshold; and
   responsive to identifying the replaceable code node:
     determine one or more substitute code nodes of the plurality of code nodes from the graph representation data object, wherein each substitute code node of the one or more of substitute code nodes represents a substitute application code one of the plurality of application codes represented by the replaceable code node,
     determine a replacement configuration of the graph representation data object, wherein the replacement configuration is characterized by a target substitute code node of the one or more substitute code nodes, and generate a protocol recommendation for the application data object based at least in part on the replacement configuration.

8. The apparatus of claim 7, wherein the at least one memory and the program code are configured to, with the one or more processors, cause the apparatus to generate the synthesized edge weight for each edge of the plurality of edges based at least in part on one or more attribute properties for the two code nodes of the plurality of code nodes connected to the edge.

9. The apparatus of claim 8, wherein each synthesized edge weight is generated based at least in part on a smoothed edge weight for the edge associated with the synthesized edge weight.

10. The apparatus of claim 7, wherein the at least one memory and the program code are configured to, with the one or more processors, cause the apparatus to determine the replacement configuration by:

perform a plurality of heterogeneity determination iterations for the one or more of substitute code nodes to generate a plurality of heterogeneity index values, wherein: (i) each heterogeneity determination iteration is associated with a substitute code node of the one or more of substitute code nodes, and (ii) performing one of the plurality of heterogeneity determination iterations comprises:

generating a potential replacement configuration of the graph representation data object by replacing the replaceable code node with the substitute code node that is associated with the heterogeneity determination iteration;

generating a synthesized edge weight for each edge of the plurality of edges connected to the substitute code node in accordance with the potential replacement configuration; and generating a heterogeneity index value for the potential replacement configuration based at least in part on each synthesized edge weight; and identifying the replacement configuration of the graph representation data object based at least in part on the potential replacement configuration that has the heterogeneity index value which satisfies a replacement threshold.

11. The apparatus of claim 7, wherein the at least one memory and the program code are configured to, with the one or more processors, cause the apparatus to:

generate user interface data for an application-based interface identifying the protocol recommendation for the application data object.

12. The apparatus of claim 11, wherein the application-based interface comprises one or more webpages provided for display through a browser residing on an end-user computing device.

13. A non-transitory computer storage medium comprising instructions configured to cause one or more processors to at least perform operations configured to:

determine a plurality of application codes for an application data object;

determine a graph representation data object that corresponds to the plurality of application codes, wherein the graph representation data object comprises: (i) a plurality of code nodes in which each code node of the plurality of code nodes represents an application code of the plurality of application codes, and (ii) a plurality of edges in which each edge of the plurality of edges connects two code nodes of the plurality of code nodes to indicate an association between the two code nodes;

identify a replaceable code node of the plurality of code nodes, wherein identifying the replaceable code node comprises:

generating an augmented relative importance value for each particular code node of the plurality of code nodes based at least in part on a synthesized edge weight for each edge of the plurality of edges connected to the particular code node, and identifying the replaceable code node based at least in part on a subset of the plurality of code nodes, where the augmented relative importance value for the replaceable code node in the subset satisfies a contribution threshold; and responsive to identifying the replaceable code node:

determine one or more substitute code nodes of the plurality of code nodes from the graph representation data object, wherein each substitute code node of the one or more of substitute code nodes represents a substitute application code one of the plurality of application codes represented by the replaceable code node, determine a replacement configuration of the graph representation data object, wherein the replacement configuration is characterized by a target substitute code node of the one or more substitute code nodes, and generate a protocol recommendation for the application data object based at least in part on the replacement configuration.

14. The non-transitory computer storage medium of claim 13, wherein the instructions are configured to cause the one or more processors to at least perform operations configured to generate the synthesized edge weight for each edge of the plurality of edges based at least in part on one or more attribute properties for the two code nodes of the plurality of code nodes connected to the edge.

15. The non-transitory computer storage medium of claim 14, wherein each synthesized edge weight is generated based at least in part on a smoothed edge weight for the edge associated with the synthesized edge weight.

16. The non-transitory computer storage medium of claim 13, wherein the instructions are configured to cause the one or more processors to at least perform operations configured to determine the replacement configuration by:

perform a plurality of heterogeneity determination iterations for the one or more of substitute code nodes to generate a plurality of heterogeneity index values, wherein: (i) each heterogeneity determination iteration is associated with a substitute code node of the one or more of substitute code nodes, and (ii) performing one of the plurality of heterogeneity determination iterations comprises:

generating a potential replacement configuration of the graph representation data object by replacing the replaceable code node with the substitute code node that is associated with the heterogeneity determination iteration;

generating a synthesized edge weight for each edge of the plurality of edges connected to the substitute code node in accordance with the potential replacement configuration; and generating a heterogeneity index value for the potential replacement configuration based at least in part on each synthesized edge weight; and identifying the replacement configuration of the graph representation data object based at least in part on the potential replacement configuration that has the heterogeneity index value which satisfies a replacement threshold.

17. The non-transitory computer storage medium of claim 13, wherein the instructions are configured to cause the one or more processors to at least perform operations configured to:

generate user interface data for an application-based interface identifying the protocol recommendation for the application data object.

* * * * *